United States Patent
Iketomi et al.

(10) Patent No.: US 9,932,039 B2
(45) Date of Patent: Apr. 3, 2018

(54) CONTROL DEVICE FOR VEHICLE

(71) Applicant: TOYOTA JIDOSHA KABUSHIKI KAISHA, Toyota-shi, Aichi-ken (JP)

(72) Inventors: Kazuhiro Iketomi, Nagoya (JP); Shinichi Sasade, Toyota (JP); Munehiro Katsumata, Toyota (JP); Kazuyuki Shiiba, Miyoshi (JP); Tooru Matsubara, Toyota (JP); Takeshi Kitahata, Toyota (JP); Kenta Kumazaki, Toyota (JP)

(73) Assignee: TOYOTA JIDOSHA KABUSHIKI KAISHA, Tokyo (JP)

( * ) Notice: Subject to any disclaimer, the term of this patent is extended or adjusted under 35 U.S.C. 154(b) by 424 days.

(21) Appl. No.: 14/846,408

(22) Filed: Sep. 4, 2015

(65) Prior Publication Data

US 2016/0068161 A1   Mar. 10, 2016

(30) Foreign Application Priority Data

Sep. 5, 2014   (JP) .................. 2014-181297

(51) Int. Cl.
*B60W 10/06*   (2006.01)
*B60W 30/188*   (2012.01)
(Continued)

(52) U.S. Cl.
CPC ............ *B60W 30/188* (2013.01); *B60K 6/36* (2013.01); *B60K 6/445* (2013.01); *B60K 6/547* (2013.01);
(Continued)

(58) Field of Classification Search
CPC .... B60W 30/188; B60W 30/19; B60W 20/10; B60W 20/30; B60W 10/06; B60W 10/08; B60W 10/111; B60W 10/11
See application file for complete search history.

(56) References Cited

U.S. PATENT DOCUMENTS

| 5,947,861 A | 9/1999 | Nobumoto |
| 6,131,680 A | 10/2000 | Nii et al. |

(Continued)

FOREIGN PATENT DOCUMENTS

| EP | 1 787 942 A1 | 5/2007 |
| EP | 2428709 A2 | 3/2012 |

(Continued)

*Primary Examiner* — Erin D Bishop
(74) *Attorney, Agent, or Firm* — Oliff PLC

(57) ABSTRACT

A control device is configured to: (i) control rotation speed of internal combustion engine such that the rotation speed of the internal combustion engine is increased with an increase in a traveling speed of a vehicle, (ii) execute a pseudo gear shift to control the rotation speed of the internal combustion engine such that the rotation speed of the internal combustion engine is decreased to a first rotation speed, (iii) execute a mechanical gear shift to change a second gear ratio according to a gear shift line determined by the traveling speed and a value according to the acceleration request, and (iv) execute adjustment control to adjust the rotation speed of the internal combustion engine in advance in a period before executing the mechanical gear shift such that the rotation speed of the internal combustion engine matches the pseudo gear shift threshold value when the mechanical gear shift is performed.

8 Claims, 18 Drawing Sheets

(51) Int. Cl.
*B60W 10/111* (2012.01)
*B60K 6/445* (2007.10)
*B60K 6/547* (2007.10)
*B60W 10/11* (2012.01)
*B60W 20/00* (2016.01)
*F16H 3/72* (2006.01)
*B60W 20/30* (2016.01)
*B60K 6/36* (2007.10)
*B60W 10/08* (2006.01)
*B60W 20/10* (2016.01)
*B60W 30/19* (2012.01)
*F16H 61/66* (2006.01)
*F16H 37/02* (2006.01)
*F16H 37/08* (2006.01)

(52) U.S. Cl.
CPC ............ *B60W 10/06* (2013.01); *B60W 10/08* (2013.01); *B60W 10/11* (2013.01); *B60W 10/111* (2013.01); *B60W 20/00* (2013.01); *B60W 20/10* (2013.01); *B60W 20/30* (2013.01); *B60W 30/19* (2013.01); *F16H 3/727* (2013.01); *B60W 2510/0638* (2013.01); *B60W 2520/10* (2013.01); *B60W 2520/105* (2013.01); *B60W 2540/10* (2013.01); *B60W 2710/0644* (2013.01); *B60W 2710/0661* (2013.01); *B60W 2710/1005* (2013.01); *B60W 2710/1011* (2013.01); *F16H 2037/023* (2013.01); *F16H 2037/0866* (2013.01); *F16H 2037/0873* (2013.01); *F16H 2061/6615* (2013.01); *Y02T 10/6239* (2013.01); *Y02T 10/6286* (2013.01); *Y10S 903/918* (2013.01); *Y10S 903/919* (2013.01); *Y10S 903/93* (2013.01)

(56) References Cited

U.S. PATENT DOCUMENTS

| 7,641,016 B2 * | 1/2010 | Unno ................ F16H 61/66259 180/230 |
| 2007/0103106 A1 | 5/2007 | Iwanaka et al. |
| 2008/0097674 A1 | 4/2008 | Kuwahara et al. |
| 2008/0147284 A1 | 6/2008 | Tuckfield et al. |
| 2010/0241297 A1 | 9/2010 | Aoki et al. |

FOREIGN PATENT DOCUMENTS

| JP | H09-133208 A | 5/1997 |
| JP | H09-308012 A | 11/1997 |
| JP | 2000-002327 A | 1/2000 |
| JP | 2006-051842 A | 2/2006 |
| JP | 2008-101742 A | 5/2008 |
| JP | 2009-126450 A | 6/2009 |
| JP | 2010-513141 A | 4/2010 |
| JP | 2011-183974 A | 9/2011 |
| WO | 2008/076418 A1 | 6/2008 |

* cited by examiner

CONTROL DEVICE FOR VEHICLE

INCORPORATION BY REFERENCE

The disclosure of Japanese Patent Application No. 2014-181297 filed on Sep. 5, 2014 including the specification, drawings and abstract is incorporated herein by reference in its entirety.

BACKGROUND OF THE INVENTION

1. Field of the Invention

The present invention relates to a control device for a vehicle including at least an internal combustion engine, a continuously variable transmission, and a stepped variable transmission.

2. Description of Related Art

A hybrid vehicle which includes a power distribution mechanism having an internal combustion engine (hereinafter, referred to as an engine), a first generator motor, a second generator motor, and a planetary gear mechanism is known. A planetary gear of the planetary gear mechanism is rotated directly by the engine through a planetary carrier. A sun gear of the planetary gear mechanism is rotated directly by the first generator motor. A ring gear of the planetary gear mechanism is rotated directly by the second generator motor through a ring carrier and rotates a drive shaft of the vehicle. A rotation shaft of the ring carrier (that is, a member rotating the drive shaft of the vehicle) can be regarded as an output shaft of the power distribution mechanism. A rotation shaft of the planetary carrier (that is, a member rotated directly by the engine) can be regarded as an input shaft of the power distribution mechanism. In this case, the power distribution mechanism can continuously change the ratio of the rotation speed of the input shaft to the rotation speed of the output shaft. Accordingly, the power distribution mechanism can be regarded as a continuously variable transmission.

In a hybrid vehicle in which such a power distribution mechanism is mounted, the engine is operated at an optimum operation point such that fuel efficiency of the engine is optimized. In this case, even if a vehicle speed increases, an engine rotation speed may not be increased, and a driver may feel a sense of discomfort. Even in a vehicle which includes only an internal combustion engine as a vehicle drive source and in which a belt driving type continuously variable transmission (CVT) is mounted, a similar sense of discomfort may be given to the driver. In contrast, Japanese Patent Application Publication No. 2006-51842 (JP 2006-51842 A) discloses a technique which controls a continuously variable transmission and an engine such that an engine rotation speed is increased at a predetermined gradient (an increase rate of the engine rotation speed) with respect to an increase in a vehicle speed when acceleration is requested.

Japanese Patent Application Publication No. 2008-101742 (JP 2008-101742 A) discloses a technique which performs a pseudo gear shift to quickly decrease an engine rotation speed during acceleration of a vehicle according to a gear shift line determined by an accelerator pedal operation amount and a vehicle speed using a continuously variable transmission.

Japanese Patent Application Publication No. 2000-2327 (JP 2000-2327 A) discloses a hybrid vehicle in which a stepped variable transmission is mounted. In JP 2000-2327 A, an input shaft of the stepped variable transmission is coupled to an output shaft of a power distribution mechanism (continuously variable transmission) so as to transmit torque. An output shaft of the stepped variable transmission is coupled to a drive shaft of the vehicle so as to transmit torque. That is, the continuously variable transmission and the stepped variable transmission are connected in series to each other.

SUMMARY OF THE INVENTION

In a vehicle in which a continuously variable transmission, such as a power distribution mechanism, and a stepped variable transmission are connected in series to each other, an engine rotation speed is increased as a vehicle speed increases during acceleration of the vehicle based on an acceleration request. In such a vehicle, when the engine rotation speed reaches a predetermined rotation speed (pseudo gear shift threshold value), the rotation speed of the engine is decreased to a first rotation speed using the characteristic that the gear ratio of the continuously variable transmission can be freely changed. That is, a pseudo gear shift is executed. With this, the engine rotation speed is increased with an increase in the vehicle speed; therefore, it is possible to reduce a sense of discomfort to the driver during acceleration compared to a vehicle in which the engine rotation speed is not increased even if the vehicle speed increases. In addition, since the pseudo gear shift is performed, the driver can sufficiently obtain a feeling of accelerating by visually recognizing an engine rotation speedometer (tachometer).

In the above-described vehicle, a mechanical gear shift by the stepped variable transmission is executed according to a gear shift line determined by a value (for example, an accelerator pedal operation amount representing a drive force required for the vehicle) according to the vehicle speed and the acceleration request. For this reason, as shown in FIG. 4A, the engine rotation speed is increased with an increase in the vehicle speed after an acceleration start time (see point Pa1), and when the engine rotation speed reaches a pseudo gear shift threshold value nejdg (see point Pa3), a pseudo gear shift is executed. Thereafter, the engine rotation speed is decreased once, and before the engine rotation speed reaches the pseudo gear shift threshold value nejdg again (see point Pa5), an actual gear shift (mechanical gear shift) based on the stepped variable transmission is executed. In this case, the engine rotation speed (the engine rotation speed of the point Pa3) at which the pseudo gear shift occurs is different from the engine rotation speed (the engine rotation speed of the point Pa5) at which the mechanical gear shift occurs. In addition, the time until the mechanical gear shift is executed after the pseudo gear shift is executed is short. With these, a sense of discomfort may be given to the driver.

The invention provides a control device for a vehicle capable of preventing generation of an irregular decrease in an engine rotation speed and giving a satisfactory sense of acceleration to a driver without giving a sense of discomfort by increasing the engine rotation speed with an increase in a vehicle speed at the time of acceleration of the vehicle and performing a pseudo gear shift and a mechanical gear shift at the substantially same engine rotation speed.

A first aspect of the invention is a control device for a vehicle. The vehicle includes an internal combustion engine, a driving wheel, a continuously variable transmission including a first input shaft and a first output shaft, the first input shaft being rotationally driven by the internal combustion engine, the continuously variable transmission being configured to continuously change a first gear ratio, and the first gear ratio being a ratio of a rotation speed of the first input shaft to a rotation speed of the first output shaft, and a stepped variable transmission including a second input shaft and a second output shaft, the second input shaft being connected to the first output shaft, the second output shaft being connected to the driving wheel, and the second output shaft being configured to transmit torque to the driving wheel, the stepped variable transmission being configured to change a second gear ratio in a stepwise manner, and the second gear ratio is a ratio of a rotation speed of the second input shaft to a rotation speed of the second output shaft. The control device includes an electronic control unit configured to (i) control a rotation speed of the internal combustion engine in a period during which the vehicle is accelerated according to an acceleration request to the vehicle such that the rotation speed of the internal combustion engine is increased with an increase in a traveling speed of the vehicle, (ii) when the rotation speed of the internal combustion engine reaches a predetermined pseudo gear shift threshold value, execute a pseudo gear shift to control the rotation speed of the internal combustion engine such that the rotation speed of the internal combustion engine is decreased to a first rotation speed, (iii) execute a mechanical gear shift to change the second gear ratio according to a gear shift line determined by the traveling speed and a value according to the acceleration request, and (iv) execute adjustment control to adjust the rotation speed of the internal combustion engine in advance in a period before executing the mechanical gear shift such that the rotation speed of the internal combustion engine matches the pseudo gear shift threshold value when the mechanical gear shift is performed.

According to the above-described configuration, an increase in the engine rotation speed with an increase in the vehicle speed and a pseudo gear shift (a decrease in the engine rotation speed) are repeated at a substantially regular interval in terms of vehicle speed. In addition, the engine rotation speed is substantially equal at the time of the start of the mechanical gear shift (that is, upshift) by the stepped variable transmission and at the time of the start of the pseudo gear shift. As a result, it is possible to suppress a sense of discomfort to the driver of the vehicle during acceleration, and the driver can feel the vehicle being accelerated satisfactorily.

In the control device, the vehicle may include an electric motor, the continuously variable transmission may be a power distribution mechanism, an output shaft of the electric motor may be connected to the first output shaft and may be configured to transmit torque to the first output shaft, and the electronic control unit may be configured to execute control of the electric motor.

According to the above-described configuration, the control device can be applied to a hybrid vehicle including a power distribution mechanism, an internal combustion engine, and an electric motor.

In the control device, the electronic control unit may be configured to adjust an engine rotation speed increase rate in the adjustment control. The engine rotation speed increase rate may be a ratio of a unit increase amount of the rotation speed of the first input shaft to a unit increase amount of the rotation speed of the first output shaft, According to the above-described configuration, it is possible to adjust the increase rate of the engine rotation speed with respect to an increase in the vehicle speed. With this, it is possible to make the engine rotation speed substantially uniform when the pseudo gear shift and the mechanical gear shift are executed.

In the control device, the electronic control unit may be configured to adjust the first rotation speed in the adjustment control.

According to the above-described configuration, when the pseudo gear shift is executed before the mechanical gear shift is executed, the engine rotation speed after the pseudo shift is executed is adjusted. With this, it is possible to make the engine rotation speed substantially uniform when the pseudo gear shift and the mechanical gear shift are executed.

In the control device, the electronic control unit may be configured to adjust a second rotation speed in the adjustment control, and the second rotation speed may be a rotation speed of the internal combustion engine at an acceleration start time when the vehicle starts to be accelerated based on the acceleration request.

According to the above-described configuration, the engine rotation speed at the acceleration start time is adjusted. With this, it is possible to make the engine rotation speed substantially uniform when the pseudo gear shift and the mechanical gear shift are executed.

In the control device, the electronic control unit may be configured to adjust at least two parameters among a plurality of parameters in the adjustment control, the plurality of parameters may include (a) an engine rotation speed increase rate that is a ratio of a unit increase amount of the rotation speed of the first input shaft to a unit increase amount of the rotation speed of the first output shaft, (b) the first rotation speed, and (c) a second rotation speed that is a rotation speed of the internal combustion engine at an acceleration start time when the vehicle starts to be accelerated based on an acceleration request to the vehicle.

When the adjustment control is performed by adjusting any one of the parameters of the engine rotation speed increase rate, the first rotation speed, and the second rotation speed, the value of a specific parameter may easily be too great or too small. For example, if the increase rate is too great, the driver is likely to feel a sense of discomfort. In contrast, according to the above-described configuration, the adjustment control is realized by adjusting a plurality of parameters; therefore, it is possible to avoid any one parameter becoming too great or too small. As a result, it is possible to avoid a sense of discomfort to the driver.

In the control device, the electronic control unit may be configured to change at least two parameters to be adjusted in the adjustment control among the engine rotation speed increase rate, the first rotation speed, and the second rotation speed within an allowable range of each parameter such that the pseudo gear shift is executed before the mechanical gear shift is executed.

According to the above-described configuration, each parameter to be adjusted is changed within the allowable range. For this reason, the value of the parameter to be adjusted is not too great or too small. As a result, it is possible to avoid a sense of discomfort to the driver.

A second aspect of the invention is a control method for a vehicle. The vehicle includes an internal combustion engine, a driving wheel, a continuously variable transmission including a first input shaft and a first output shaft, the first input shaft being rotationally driven by the internal combustion engine, the continuously variable transmission being configured to continuously change a first gear ratio, and the first gear ratio being the ratio of a rotation speed of the first input shaft to a rotation speed of the first output shaft, and a stepped variable transmission including a second input shaft and a second output shaft, the second input shaft being connected to the first output shaft, the second output shaft being connected to the driving wheel and the second output shaft being configured to transmit torque to the driving wheel, the stepped variable transmission being configured to change a second gear ratio in a stepwise manner, and the second gear ratio being the ratio of a rotation speed of the second input shaft to a rotation speed of the second output shaft. The control method includes controlling a rotation speed of the internal combustion engine in a period during which the vehicle is accelerated according to an acceleration request to the vehicle such that the rotation speed of the internal combustion engine is increased with an increase in a traveling speed of the vehicle, when the rotation speed of the internal combustion engine reaches a predetermined pseudo gear shift threshold value, executing a pseudo gear shift to control the rotation speed of the internal combustion engine such that the rotation speed of the internal combustion engine is decreased to a first rotation speed, executing a mechanical gear shift to change the second gear ratio according to a gear shift line determined by the traveling speed and a value according to the acceleration request, and executing adjustment control to adjust the rotation speed of the internal combustion engine in advance in a period before executing the mechanical gear shift such that the rotation speed of the internal combustion engine matches the pseudo gear shift threshold value when the mechanical gear shift is performed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
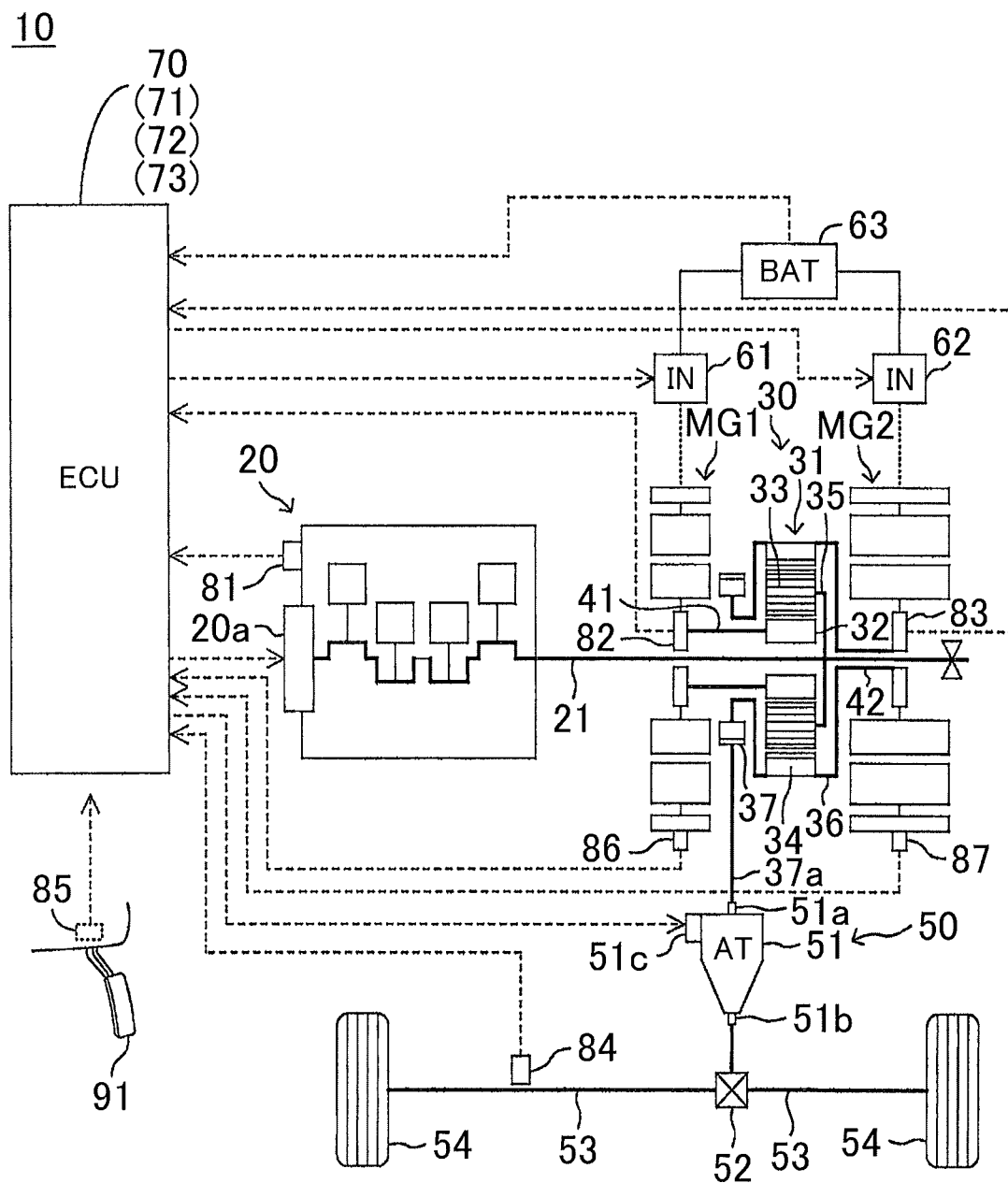
FIG. 1 is a schematic configuration diagram of a vehicle to which a control device according to each embodiment of the invention is applied.

Hereinafter, a control device for a vehicle according to each embodiment of the invention will be described referring to the drawings.

First Embodiment

A control device (hereinafter, referred to as a first device) according to a first embodiment of the invention is applied to a vehicle 10 having the schematic configuration shown in FIG. 1.

The vehicle 10 is a hybrid vehicle including a first electric motor (generator motor) MG1, a second electric motor (generator motor) MG2, and an engine 20. The vehicle 10 further includes a power distribution mechanism 30, a power transmission mechanism 50, a first inverter 61, a second inverter 62, a storage battery 63, and an electronic control unit (ECU) 70.

The first electric motor MG1 and the second electric motor MG2 respectively include a stator which includes a three-phase winding (coil) generating a rotating magnetic field, and a rotor which includes a permanent magnet generating torque by magnetic force with the rotating magnetic field.

Each of the first electric motor MG1 and the second electric motor MG2 can operate as an electric motor and a generator. The first electric motor MG1 is primarily used as a generator, and can perform clutching of the engine 20 at the time of starting of the engine 20. The first electric motor MG1 includes a output shaft 41. The second electric motor MG2 is primarily used as an electric motor, and can generate a drive force (torque causing the vehicle to travel) of the vehicle 10. The second electric motor MG2 includes a output shaft 42.

The engine 20 is a four-cycle spark ignition type internal combustion engine, and has a plurality of cylinders. The engine 20 can generate the drive force of the vehicle 10. The engine 20 includes an engine actuator 20a. The engine actuator 20a includes a throttle valve which adjusts an intake air amount of the engine 20, a fuel injection valve which supplies (injects) fuel to the engine 20, an ignition device which includes an ignition plug and changes an ignition time, and the like. The engine actuator 20a is operated, whereby the engine 20 can change torque to be generated and/or an engine rotation speed NE.

The power distribution mechanism 30 includes a planetary gear device 31. The planetary gear device 31 includes a sun gear 32, a plurality of planetary gears 33, a ring gear 34, a planetary carrier 35, and a ring carrier 36.

Each of a plurality of planetary gears 33 is in mesh with the sun gear 32 and the ring gear 34. A rotation shaft (rotating shaft) of the planetary gear 33 is provided in the planetary carrier 35. The planetary carrier 35 is held so as to be rotatable coaxially with the sun gear 32. Accordingly, the planetary gear 33 can rotate and revolve around the outer periphery of the sun gear 32. The ring gear 34 is held so as to be rotatable coaxially with the sun gear 32.

The sun gear 32 is connected to the output shaft 41. The planetary carrier 35 is a crankshaft 21 of the engine 20. The ring gear 34 is connected to the output shaft 42 through the ring carrier 36. The ring gear 34 is also connected to an output gear 37 through the ring carrier 36.

The power transmission mechanism 50 includes a stepped variable transmission 51, a differential gear 52, and a drive shaft 53. The drive shaft 53 is connected to a driving wheel 54 of the vehicle 10.

The stepped variable transmission 51 is an automatic transmission. The stepped variable transmission 51 includes an input shaft 51a and an output shaft 51b. The automatic transmission can change a gear ratio, which is the ratio of a rotation speed of the input shaft 51a to a rotation speed of the output shaft 51b, in four steps in a stepwise manner (discretely). That is, the stepped variable transmission 51 is a four-gear transmission. The input shaft 51a of the stepped variable transmission 51 is connected to a rotation shaft 37a of the output gear 37. The output shaft 51b of the stepped variable transmission 51 is connected to the differential gear 52.

The stepped variable transmission 51 includes a transmission actuator 51c. The transmission actuator 51c includes a hydraulic circuit and an electromagnetic valve for hydraulic switching. The transmission actuator 51c is operated, whereby the stepped variable transmission 51 can select and realize a predetermined shift gear stage (first gear to fourth gear).

The differential gear 52 transmits torque to the driving wheel 54 through the drive shaft 53. The vehicle 10 can travel with torque transmitted to the driving wheel 54.

The first inverter 61 is electrically connected to the first electric motor MG1 and the storage battery 63. Accordingly, when the first electric motor MG1 generates electric power, electrical power generated by the first electric motor MG1 is supplied to the storage battery 63 through the first inverter 61. Conversely, the first electric motor MG1 is rotationally driven with electric power supplied from the storage battery 63 through the first inverter 61.

The second inverter 62 is electrically connected to the second electric motor MG2 and the storage battery 63. Accordingly, the second electric motor MG2 is rotationally driven with electric power supplied from the storage battery 63 through the second inverter 62. Conversely, when the second electric motor MG2 generates electric power, electric power generated by the second electric motor MG2 is supplied to the storage battery 63 through the second inverter 62.

Electric power generated by the first electric motor MG1 can be supplied directly to the second electric motor MG2, and electric power generated by the second electric motor MG2 can be supplied directly to the first electric motor MG1.

The ECU 70 is a microcomputer including a CPU, a ROM, a RAM, and the like. The ROM stores programs which are executed by the CPU, look-up tables (maps), and the like. The RAM temporarily stores data. The ECU 70 is connected to a crank angle sensor 81, a first resolver 82, a second resolver 83, a vehicle speed sensor 84, an accelerator opening sensor 85, a first temperature sensor 86, and a second temperature sensor 87. The ECU 70 is configured to receive signals from the sensors.

The crank angle sensor 81 generates a signal representing the rotation position of the crankshaft 21 of the engine 20. The ECU 70 calculates the engine rotation speed NE based on the signal of the crank angle sensor 81. The first resolver 82 generates a signal representing the rotation position of the first electric motor MG1. The ECU 70 calculates a rotation speed Nm1 of the first electric motor MG1 based on the signal of the first resolver 82. The second resolver 83 generates a signal representing the rotation position of the second electric motor MG2. The ECU 70 calculates a rotation speed Nm2 of the second electric motor MG2 based on the signal of the second resolver 83. The vehicle speed sensor 84 generates a signal representing a traveling speed (vehicle speed) Vs of the vehicle 10.

The accelerator opening sensor 85 generates a signal representing an opening (accelerator pedal operation amount) Ap of an accelerator pedal 91 which is operated when a driver accelerates the vehicle 10. That is, as the driver depresses the accelerator pedal 91, the accelerator pedal operation amount Ap increases and requested torque becomes great.

The first temperature sensor 86 generates a signal representing a temperature Tm1 of the field winding in the first electric motor MG1. The second temperature sensor 87 generates a signal representing a temperature Tm2 of the field winding in the second electric motor MG2.

The ECU 70 is connected to the engine actuator 20a and the transmission actuator 51c. The ECU 70 is configured to transmit drive signals (instruction signals) to the actuators.

The ECU 70 calculates torque to be generated from the driving wheel 54 based on the vehicle speed Vs of the vehicle 10, the accelerator pedal operation amount Ap, and the like. The ECU 70 controls the first inverter 61, the second inverter 62, the engine 20, and the like such that the calculated torque is generated from the driving wheel 54.

Figure 2:
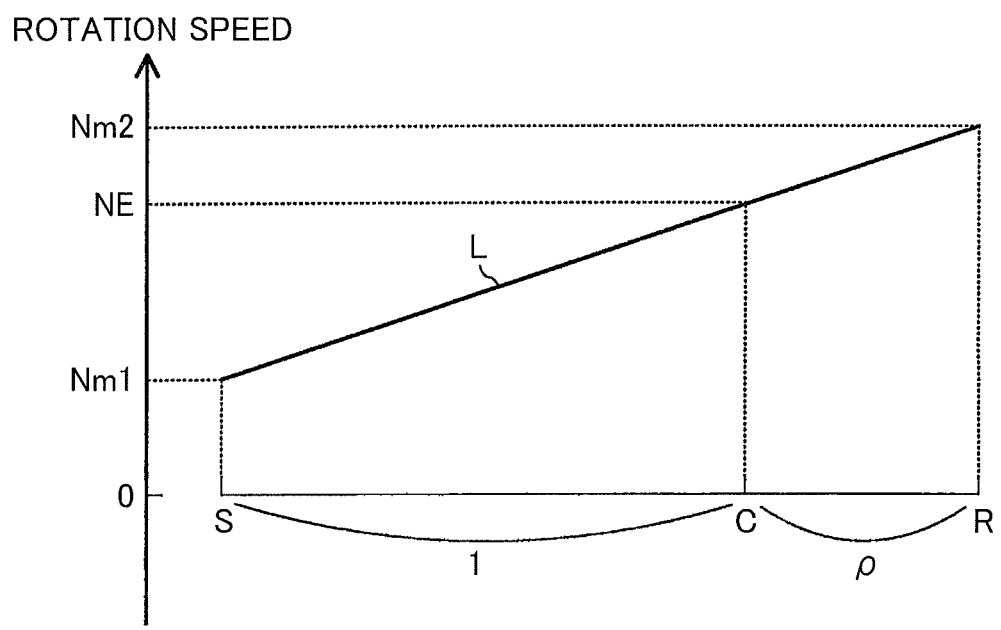
FIG. 2 is a nomographic chart showing the relationship of rotation speeds of respective gears in a planetary gear device provided in the vehicle.

The relationship of the rotation speed Nm1 of the first electric motor MG1, the rotation speed Nm2 of the second electric motor MG2, and the rotation speed NE of the engine 20, that is, the relationship of the rotation speeds of the respective gears in the planetary gear device 31 is represented by a known nomographic chart shown in FIG. 2. A straight line shown in the nomographic chart is called an operating collinear line L. Here, a rotation speed Ns of the sun gear 32 is equal to the rotation speed Nm1 of the first electric motor MG1. Referring to FIG. 2, the rotation speed Ns of the sun gear 32 can be obtained by Expression (1) described below.

$$Ns=Nr-(Nr-NE)\cdot(1+\rho)/\rho \quad (1)$$

In Expression (1), ρ is the ratio (ρ=the number of teeth of the sun gear 32/the number of teeth of the ring gear 34) of the number of teeth of the sun gear 32 to the number of teeth of the ring gear 34. As will be understood from the operating collinear line L, Expression (1) is derived based on the proportional relationship that the ratio (=(NE−Ns)/(Nr−Ns)) of the difference (NE−Ns) between the engine rotation speed NE and the rotation speed Ns of the sun gear 32 to the difference (Nr−Ns) between a rotation speed Nr of the ring gear 34 and the rotation speed Ns of the sun gear 32 is equal to the ratio of (=1/(1+ρ)) of 1 to a value (1+ρ). Here, the rotation speed Nr of the ring gear 34 is equal to the rotation speed Nm2 of the second electric motor MG2.

From the above, the engine rotation speed NE changes depending on the rotation speed Nm1 of the first electric motor MG1 and the rotation speed Nm2 of the second electric motor MG2. In other words, if the engine rotation speed NE changes, the rotation speed Nm1 and/or the rotation speed Nm2 changes.

The second electric motor MG2 is connected directly to the ring gear 34 and the ring carrier 36 as the output shaft of the power distribution mechanism 30. The engine 20 is connected directly to the planetary carrier 35 as the input shaft of the power distribution mechanism 30. Accordingly, the ratio A of the rotation speed (that is, the engine rotation speed) of the planetary carrier 35 as the input shaft to the rotation speed of the ring carrier 36 as the output shaft can be changed continuously (in a stepless manner). The ratio A is appropriately called a first gear ratio. Therefore, the power distribution mechanism 30 can be regarded as a continuously variable transmission which can continuously change the first gear ratio.

The ECU 70 acquires the remaining capacity (SOC) of the storage battery 63 and controls the engine 20 according to the remaining capacity. With this, the ECU 70 causes the first electric motor MG1 (and the second electric motor MG2) to generate electric power and controls the first inverter 61 and the second inverter 62 to charge the storage battery 63.

The ECU 70 executes an EV traveling mode in which the vehicle 10 is made to travel while operating at least one of the first electric motor MG1 and the second electric motor MG2 in a state where the engine 20 is stopped. The ECU 70 can execute an HV traveling mode in which the engine 20 and at least one of the first electric motor MG1 and the second electric motor MG2 are operated to make the vehicle 10 travel. That is, the ECU 70 can selectively realize both the EV traveling mode and the HV traveling mode. The ECU 70 determines a traveling mode to be executed from the remaining capacity of the storage battery 63, the vehicle speed Vs, the accelerator pedal operation amount Ap, and the like.

Traveling control of a hybrid vehicle in an HV traveling mode and an EV traveling mode is described in detail in, for example, Japanese Patent Application Publication No. 2009-126450 (JP 2009-126450 A) (US 2010/0241297 A), Japanese Patent Application Publication No. 9-308012 (JP 9-308012 A) (U.S. Pat. No. 6,131,680 filed on Mar. 10, 1997), and the like. These are incorporated herein by reference.

Figure 3:
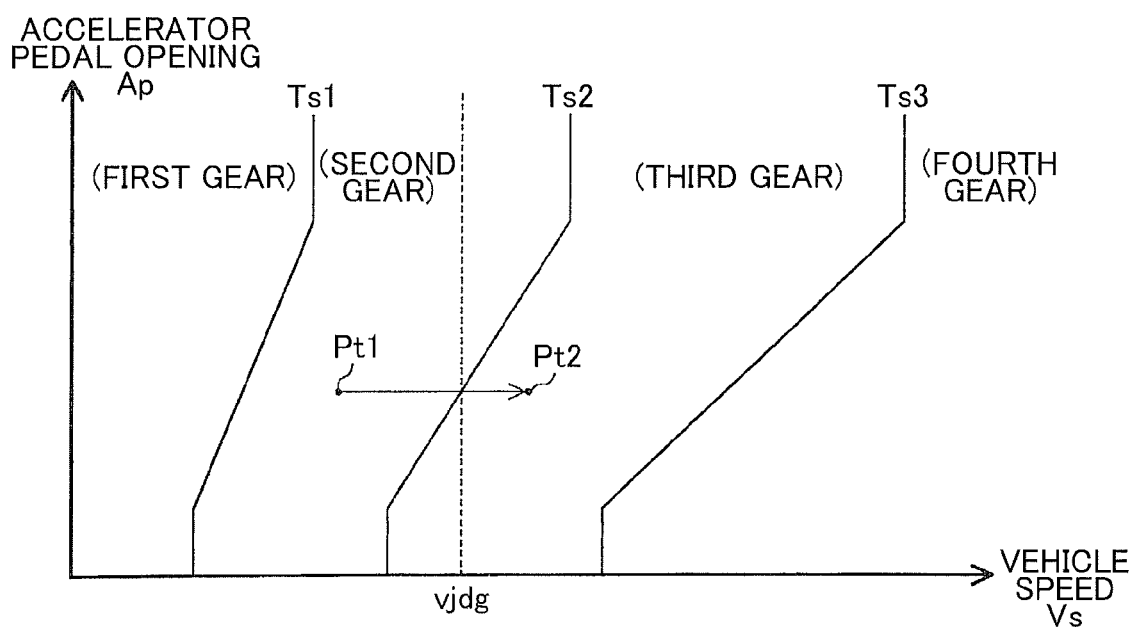
FIG. 3 is a graph showing a gear shift line in a stepped variable transmission provided in the vehicle.

The ECU 70 executes a routine (not shown) to change the gear ratio of the stepped variable transmission 51 according to the vehicle speed Vs, the accelerator pedal operation amount Ap, and gear shift lines Ts1 to Ts3 shown in FIG. 3 (changes the shift gear stage). That is, the ECU 70 performs processing for performing a mechanical gear shift to send a drive signal to the transmission actuator 51c. For example, when the driving state (the combination of the vehicle speed Vs and the accelerator pedal operation amount Ap) of the vehicle 10 changes from a point Pt1 to a point Pt2, the ECU 70 executes an upshift from the second gear to the third gear at a speed (vehicle speed) vjdg when the driving state of the vehicle 10 exceeds the gear shift line Ts2. The speed vjdg at which the upshift is executed is called a gear shift speed.

Next, the outline of the operation of the ECU 70 of the first device will be described.

First, control to be a premise of engine rotation speed increase control (hereinafter, simply referred to as NE increase control) in the first device will be described.

In the hybrid vehicle described above, during normal driving (steady driving state, non-acceleration), the engine 20 is operated at an optimum operation point where fuel efficiency of the engine 20 is optimized. For this reason, even if the vehicle speed Vs increases, the engine rotation speed NE is not increased.

In contrast, when there is an acceleration request from the driver of the vehicle 10 (that is, at the time of acceleration with a great accelerator pedal operation amount Ap), the ECU 70 executes the NE increase control. The NE increase control is control for increasing the engine rotation speed NE with an increase in the vehicle speed Vs. The ECU 70 executes pseudo gear shift processing for quickly decreasing the engine rotation speed NE using the power distribution mechanism 30 separately from the mechanical gear shift by the stepped variable transmission 51 when the engine rotation speed NE reaches a predetermined rotation speed (pseudo gear shift threshold value nejdg).

Figure 4A:
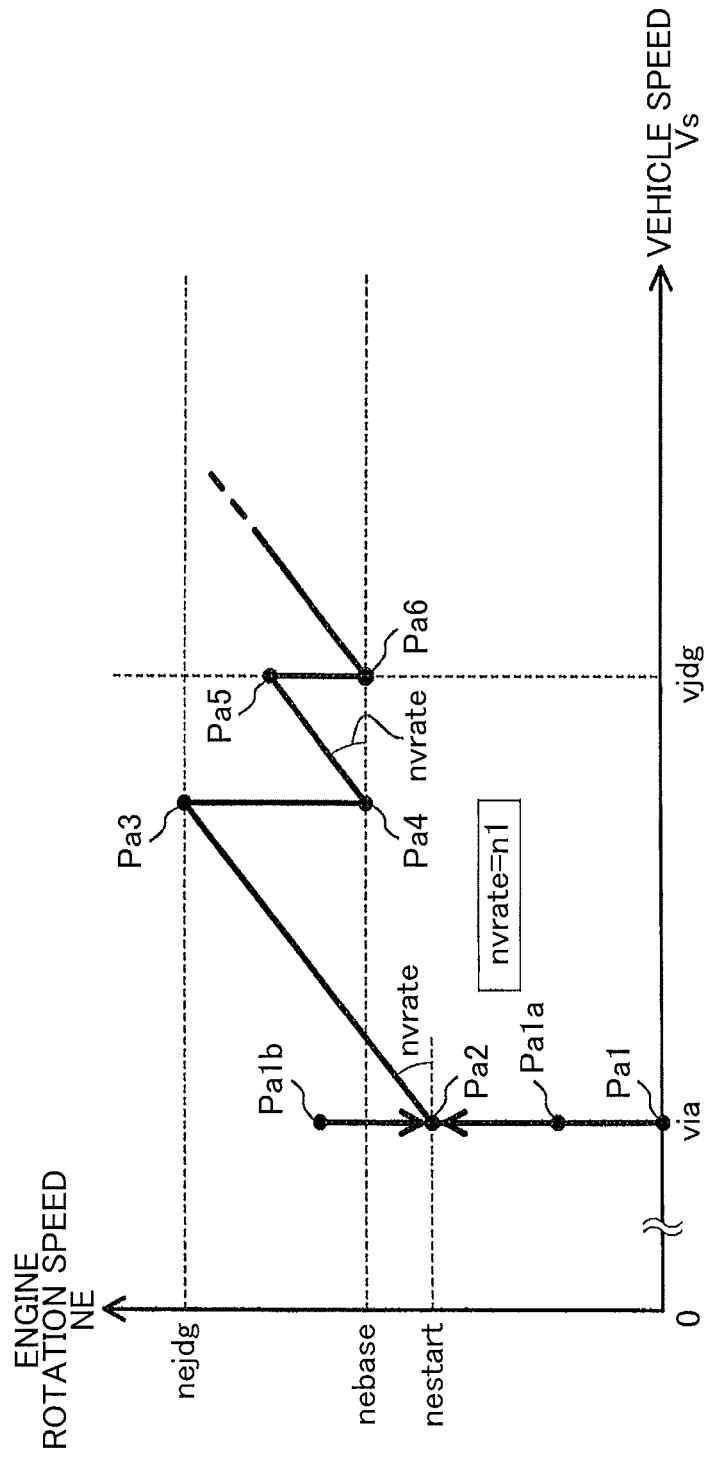
FIGS. 4A and 4B are graphs illustrating the outline of engine rotation speed increase control which is executed by a control device (first device) according to a first embodiment.

The NE increase control will be described referring to FIG. 4A. In an example shown in FIG. 4A, when the operation point (the combination of the vehicle speed Vs and the engine rotation speed NE) of the vehicle 10 is at the point Pa1, the accelerator pedal 91 is greatly depressed, and as a result, the NE increase control is started. In the example shown in FIG. 4A, since the ECU 70 makes the vehicle 10 travel in the EV traveling mode immediately before the NE increase control is started, the engine 20 is stopped.

When the NE increase control is started, the ECU 70 starts the engine 20 and further increases the engine rotation speed NE to a second rotation speed nestart. As a result, the operation point becomes a point Pa2.

When the NE increase control is started, and when the ECU 70 makes the vehicle 10 travel in the HV traveling mode, or the like, the engine 20 may be operated. In this case, for example, when the operation point is at a point Pa1a, the ECU 70 increases the engine rotation speed NE to the second rotation speed nestart and moves the operation point to the point Pa2. Similarly, when the NE increase control is started, and when the operation point is at a point Pa1b, the ECU 70 decreases the engine rotation speed NE to the second rotation speed nestart and moves the operation point to the point Pa2.

Thereafter, the ECU 70 increases drive torque generated by the engine 20 and/or the second electric motor MG2 to increase the vehicle speed Vs. At this time, the ECU 70 maintains an engine rotation speed increase rate nvrate (nvrate=NE/Vs), which is the ratio of an increase amount of the engine rotation speed NE to an increase amount of the vehicle speed Vs, at a predetermined value n1. The increase rate nvrate is called a rotation speed-to-vehicle speed ratio nvrate. As a result, the engine rotation speed NE is increased in proportion to the vehicle speed Vs. That is, as the vehicle speed Vs becomes higher, the engine rotation speed NE becomes higher.

In such a situation, the mechanical gear shift is not performed. Accordingly, the vehicle speed Vs (in other words, the rotation speed of the drive shaft 53) is proportional to the rotation speed Nm2 of the second electric motor MG2 connected to the drive shaft 53 through the stepped variable transmission 51, the output gear 37, and the ring gear 34. Therefore, the rotation speed Nm2 of the second electric motor MG2 is proportional to the vehicle speed Vs. For this reason, the ECU 70 adjusts the rotation speed Nm1 of the first electric motor MG1 according to the rotation speed Nm2 and the engine rotation speed NE so as to follow Expression (1) described above when increasing the engine rotation speed NE in proportion to the vehicle speed Vs.

That is, if the vehicle speed Vs increases, the rotation speed Nm2 increases. For this reason, the ECU 70 also increases the rotation speed Nm1 of the first electric motor MG1 with an increase in the rotation speed Nm2 such that the engine rotation speed NE can be increased with an increase in the vehicle speed Vs.

Thereafter, the engine rotation speed NE reaches the pseudo gear shift threshold value nejdg. The pseudo gear shift threshold value nejdg is a predetermined value which is determined based on the accelerator pedal operation amount Ap by the ECU 70 at the time of the start of the NE increase control.

If the engine rotation speed NE reaches the pseudo gear shift threshold value nejdg, the ECU 70 executes the pseudo gear shift processing. That is, when the operation point of the engine 20 becomes the point Pa3, the ECU 70 decreases the engine rotation speed NE quickly to a predetermined first rotation speed nebase. The engine rotation speed NE being quickly decreased while the vehicle speed Vs is increasing is the same phenomenon as a phenomenon (a phenomenon accompanied by a change in a gear ratio) which occurs when an upshift by the stepped variable transmission is performed. Accordingly, an operation to decrease the engine rotation speed NE quickly to the first rotation speed nebase using the power distribution mechanism 30 when the mechanical gear shift is not performed is called a pseudo gear shift for convenience. The first rotation speed nebase is a predetermined value which is determined based on the accelerator pedal operation amount Ap or the like by the ECU 70 at the time of the start of the NE increase control.

The ECU 70 decreases the rotation speed Nm1 of the first electric motor MG1 quickly when executing the pseudo gear shift processing. At this time, the ECU 70 decreases the amount of fuel supplied to the combustion chamber of the engine 20. Alternatively, the ECU 70 may make the amount of fuel supplied to the combustion chamber of the engine 20 at this time zero. As a result of the pseudo gear shift processing, the operation point becomes a point Pa4.

After the execution of the pseudo gear shift processing, the ECU 70 increases the engine rotation speed NE at the increase rate nvrate with an increase in the vehicle speed Vs. As a result, when the vehicle speed Vs reaches a gear shift speed vjdg, that is, when the operation point becomes a point Pa5, the ECU 70 executes mechanical gear shift processing. That is, the ECU 70 performs an upshift to increase the shift gear stage of the stepped variable transmission 51 by one stage. At this time, the ECU 70 adjusts the rotation speed Nm1 of the first electric motor MG1 such that the engine rotation speed NE is decreased quickly to the first rotation speed nebase.

In control to be a premise of the NE increase control described above, the pseudo gear shift processing is executed when the engine rotation speed NE reaches the pseudo gear shift threshold value nejdg. In addition, the mechanical gear shift processing is executed when the vehicle speed Vs reaches the gear shift speed vjdg (the driving state of the vehicle 10 crosses the gear shift line). For this reason, the engine rotation speed NE (that is, the pseudo gear shift threshold value nejdg) at the operation point Pa3 where the pseudo gear shift processing is executed may be different from the engine rotation speed NE at the operation point Pa5 where the mechanical gear shift processing is executed. In this case, the engine rotation speed NE which is visually recognized by a rotation speedometer (tachometer) provided in a dashboard (not shown) of the vehicle 10 is repeatedly moved up and down irregularly, whereby the driver of the vehicle 10 may feel a sense of discomfort.

In this embodiment, the ECU 70 adjusts the engine rotation speed NE such that the engine rotation speed NE which the mechanical gear shift processing is executed matches the engine rotation speed NE (that is, the pseudo gear shift threshold value nejdg) when the pseudo gear shift processing is executed. The adjustment of the engine rotation speed NE is performed by adjusting the increase rate nvrate during the NE increase control in advance.

Figure 4B:
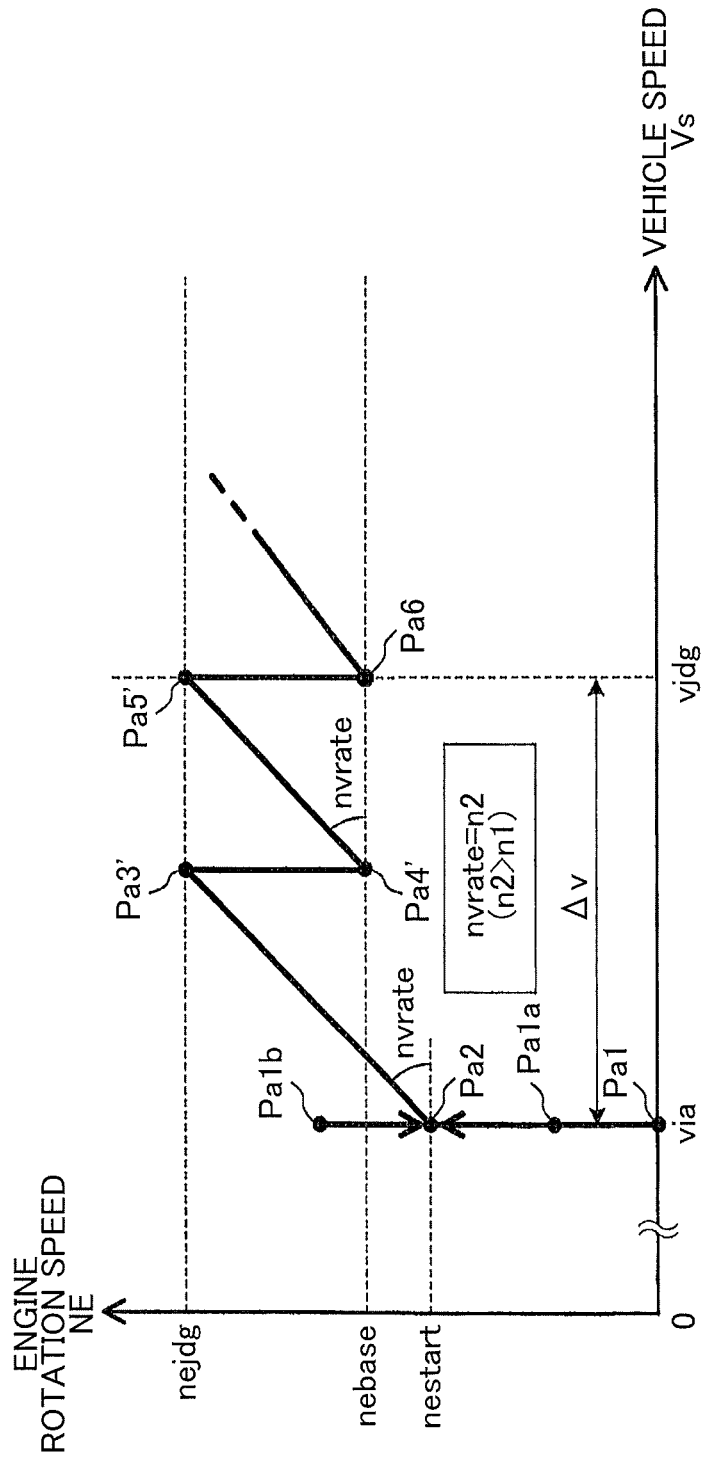

The control will be specifically described referring to FIG. 4B. The ECU 70 assumes that the subsequent accelerator pedal operation amount Ap is not changed at the NE increase control start time, and acquires an expected gear shift speed vjdg, at which the mechanical gear shift (upshift) is performed next, based on the gear shift line shown in FIG. 3. The ECU 70 acquires a vehicle speed via at the NE increase control start time (operation point Pa1).

Then, the ECU 70 calculates (determines) the increase rate nvrate based on the second rotation speed nestart, the pseudo gear shift threshold value nejdg, the first rotation speed nebase, and the difference Δv between the gear shift speed vjdg and the vehicle speed via at the time of the start of the NE increase control such that the engine rotation speed NE when the mechanical gear shift processing is executed matches the pseudo gear shift threshold value nejdg. In an example shown in FIG. 4B, the increase rate nvrate calculated in such a manner is a value n2 greater than the value n1.

The ECU 70 performs the processing (including the pseudo gear shift processing and the mechanical gear shift processing) of the NE increase control using the increase rate nvrate. As a result, pseudo gear shift control is executed at an operation point Pa3' where the engine rotation speed NE becomes equal to the pseudo gear shift threshold value nejdg, and mechanical gear shift control is executed at an operation point Pa5' where the engine rotation speed NE becomes equal to the pseudo gear shift threshold value nejdg. With this, the pseudo gear shift and the mechanical gear shift are executed at the substantially same engine rotation speed NE, and the occurrence of the mechanical gear shift immediately after the pseudo gear shift is avoided. Therefore, the first device can reduce a sense of discomfort to the driver.

The ECU 70 makes as many pseudo gear shifts as possible occur before a mechanical gear shift occurring next during the execution of the NE increase control while adjusting the increase rate nvrate within an allowable range of an upper limit value (upper increase rate nvmax) and a lower limit value (lower limit increase rate nvmin) This is because the occurrence of many pseudo gear shifts can allow the driver to obtain a more satisfactory sense of acceleration. In addition, it is because, if the increase rate nvrate is equal to or greater than the upper limit increase rate nvmax, the pseudo gear shift frequently occurs and the driver feels a sense of discomfort; whereas, if the increase rate nvrate is less than the lower limit increase rate nvmin, the increase amount of the engine rotation speed NE to the increase amount of the vehicle speed Vs becomes small, and the driver hardly obtains a sense of acceleration.

Figure 5:
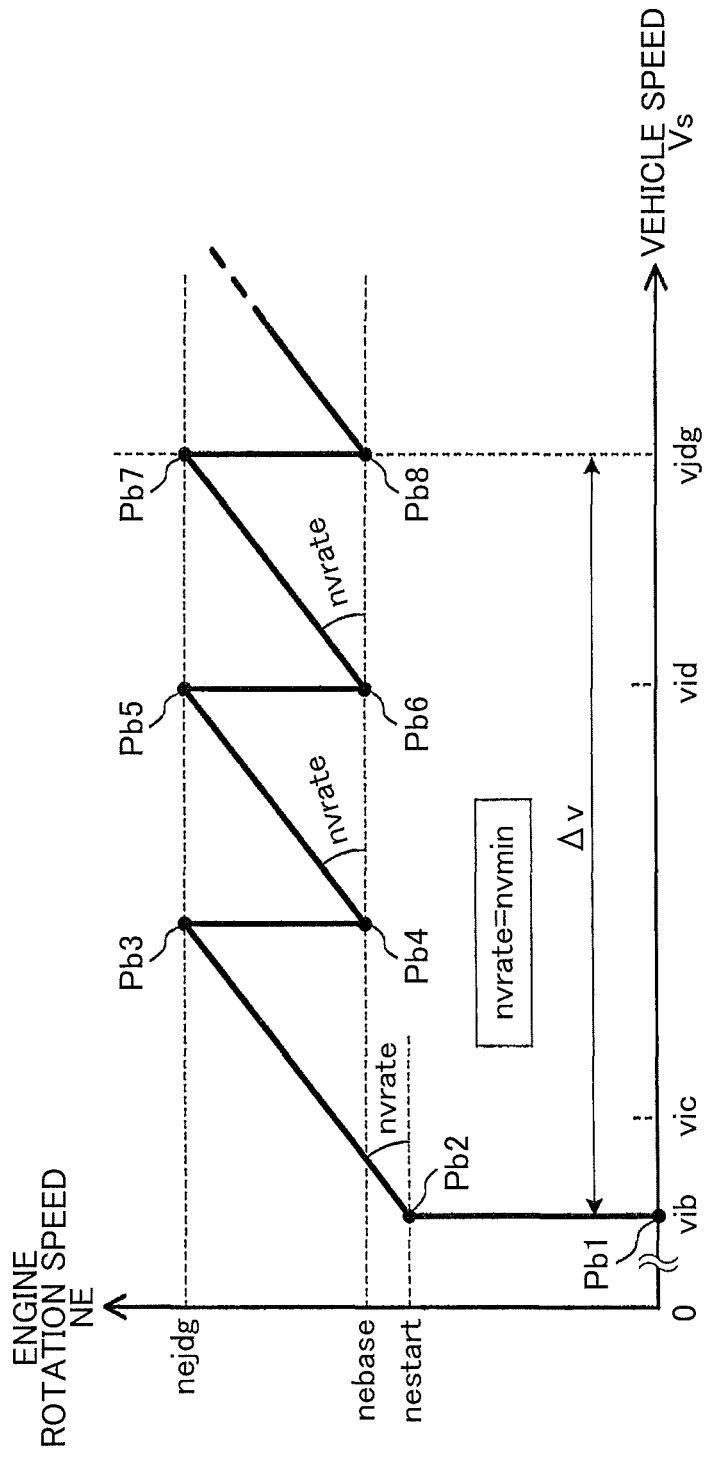
FIG. 5 is a graph showing a state of the engine rotation speed increase control which is executed by the first device.

For example, in an example shown in FIG. 5, the vehicle speed at the time of the start of the NE increase control is a vehicle speed vib. In this case, the difference Δv between the gear shift speed vjdg and the vehicle speed vib is comparatively great. For this reason, the ECU 70 sets the increase rate nvrate to the lower limit increase rate nvmin and executes two pseudo gear shifts (operation points Pb3 and Pb5) before the mechanical gear shift (see an operation point Pb7). In this example, even if the increase rate nvrate is set to the upper limit increase rate nvmax, three pseudo gear shifts cannot be executed before the mechanical gear shift (see the operation point Pb7).

Figure 6:
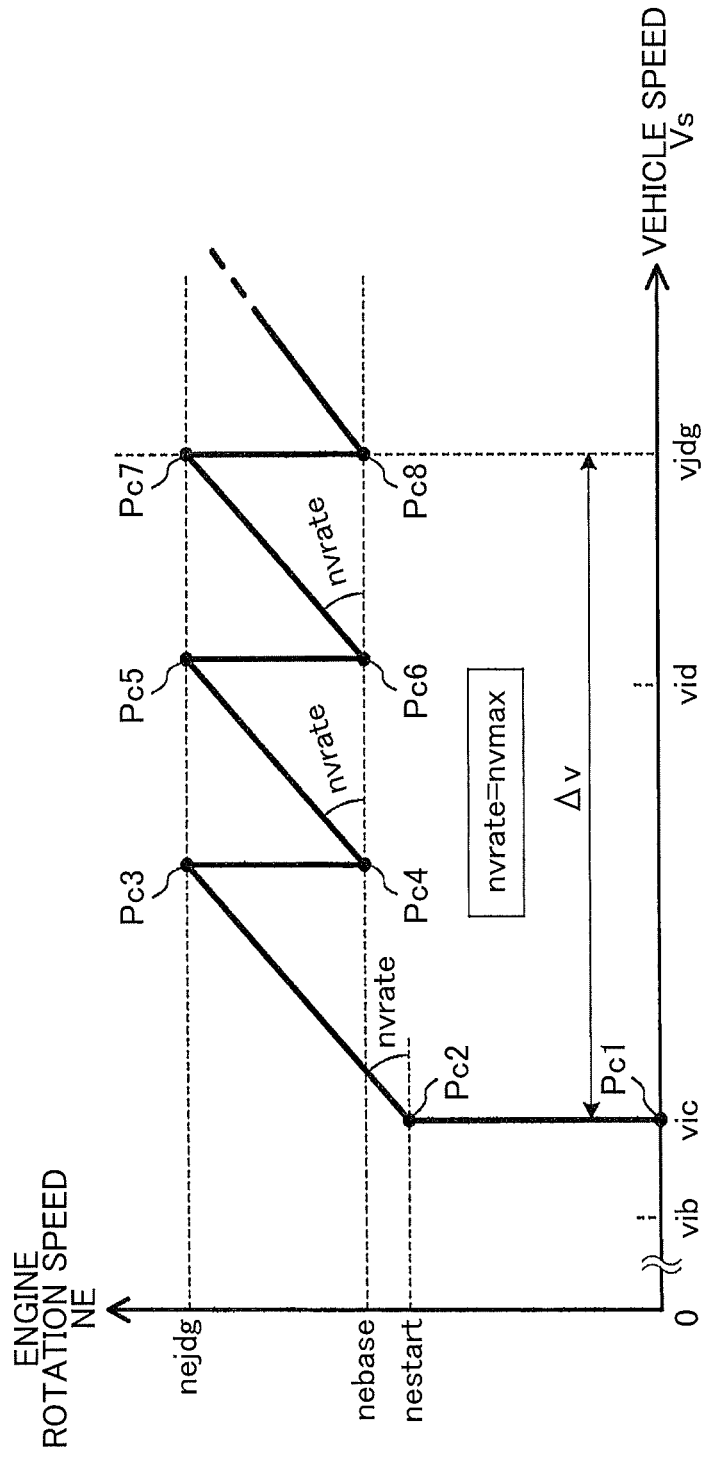
FIG. 6 is a graph showing a state of the engine rotation speed increase control which is executed by the first device.

In an example shown in FIG. 6, the vehicle speed at the time of the start of the NE increase control is a vehicle speed vic higher than the vehicle speed vib, and the difference Δv between the gear shift speed vjdg and the vehicle speed vic is smaller than in the example shown in FIG. 5 by a predetermined speed. For this reason, the ECU 70 sets the increase rate nvrate to the upper limit increase rate nvmax and executes two pseudo gear shifts (see the operation points Pc3 and Pc5) before the mechanical gear shift (see an operation point Pc7).

Figure 7:
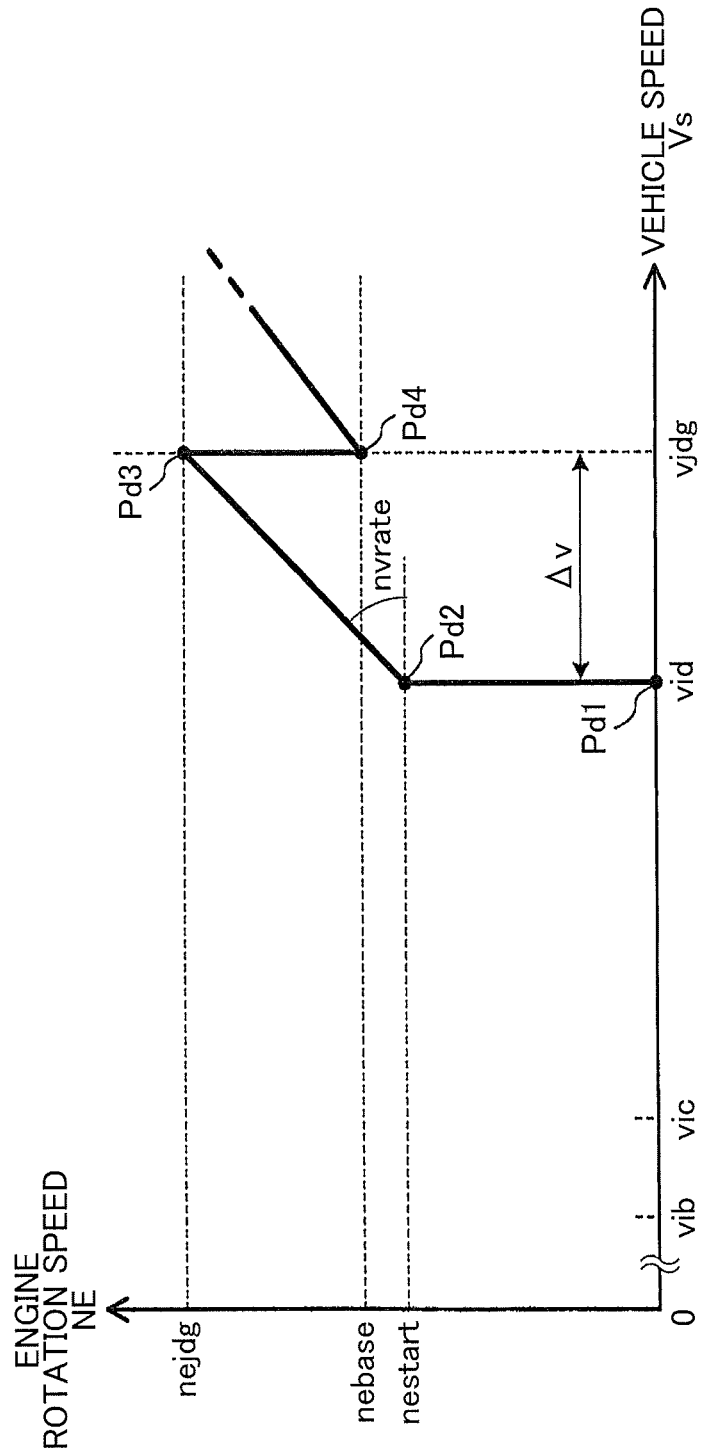
FIG. 7 is a graph showing a state of the engine rotation speed increase control which is executed by the first device.

In an example shown in FIG. 7, the vehicle speed at the time of the start of the NE increase control is a vehicle speed vid close to the gear shift speed vjdg, and the difference Δv between the gear shift speed vjdg and the vehicle speed vid is smaller than in the example shown in FIG. 6. In this case, even if the increase rate nvrate is set to the upper limit increase rate nvmax, one pseudo gear shift cannot be executed before the mechanical gear shift (see an operation point Pd3). Accordingly, the ECU 70 sets the increase rate nvrate to a predetermined value between the upper limit increase rate nvmax and the lower limit increase rate nvmin, and makes the engine rotation speed NE at the mechanical gear shift (see the operation point Pd3) match the pseudo gear shift threshold value nejdg.

Next, the specific operation of the first device will be described. The CPU of the ECU 70 is configured to store on the RAM a control execution flag Xdt representing whether or not the NE increase control described above should be executed. The value of the control execution flag Xdt is set to 0 in an initial routine (not shown) which is executed by the CPU. The initial routine is executed when the position of an ignition switch in the vehicle 10 is changed from an on position to an off position. As described below, the value of the control execution flag Xdt is set to 1 in a state where the NE increase control should be executed, and is set to 0 when there is no need to execute the NE increase control.

Figure 8:
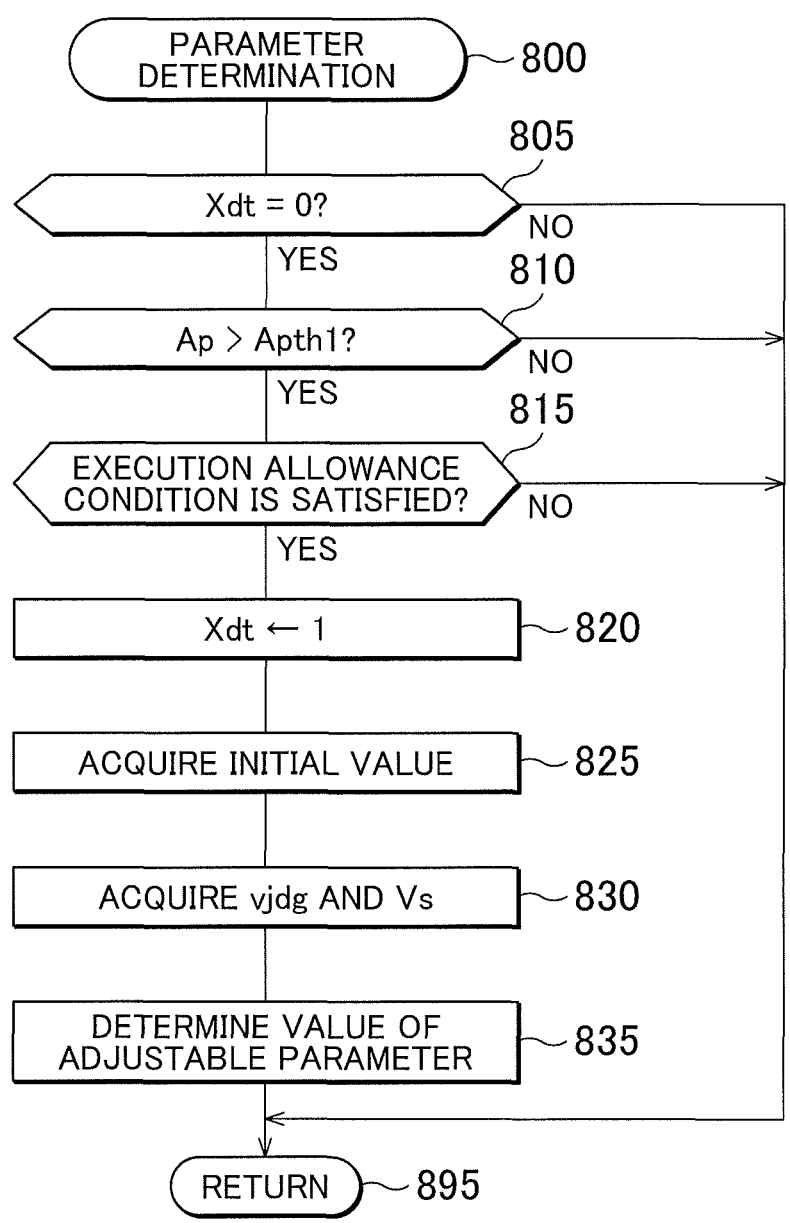
FIG. 8 is a flowchart showing an engine rotation speed increase control routine which is executed by the first device.

The CPU is configured to execute a parameter determination routine shown in the flowchart of FIG. 8 each time a predetermined time elapses. Accordingly, the CPU starts processing from Step 800 of FIG. 8 at an appropriate timing, progresses to Step 805, and determines whether or not the value of the control execution flag Xdt is 0.

(A) A case where the accelerator pedal 91 is not greatly depressed and the vehicle 10 is not in quick acceleration. In this case, since the value of the control execution flag Xdt is 0, the CPU determines to be Yes in Step 805, progresses to Step 810, and determines whether or not the accelerator pedal operation amount Ap is greater than a predetermined threshold value (control start determination threshold value) Apth1. The control start determination threshold value Apth1 is the accelerator pedal operation amount Ap which is reached when the driver requests quick acceleration.

On the assumption described above, since the accelerator pedal 91 is not greatly depressed, the accelerator pedal operation amount Ap is smaller than the control start determination threshold value Apth1. Accordingly, the CPU determines to be No in Step 810, progresses directly to Step 895, and ends this routine once. Therefore, in this case, the value of the control execution flag Xdt is not changed and is maintained to 0.

Figure 9:
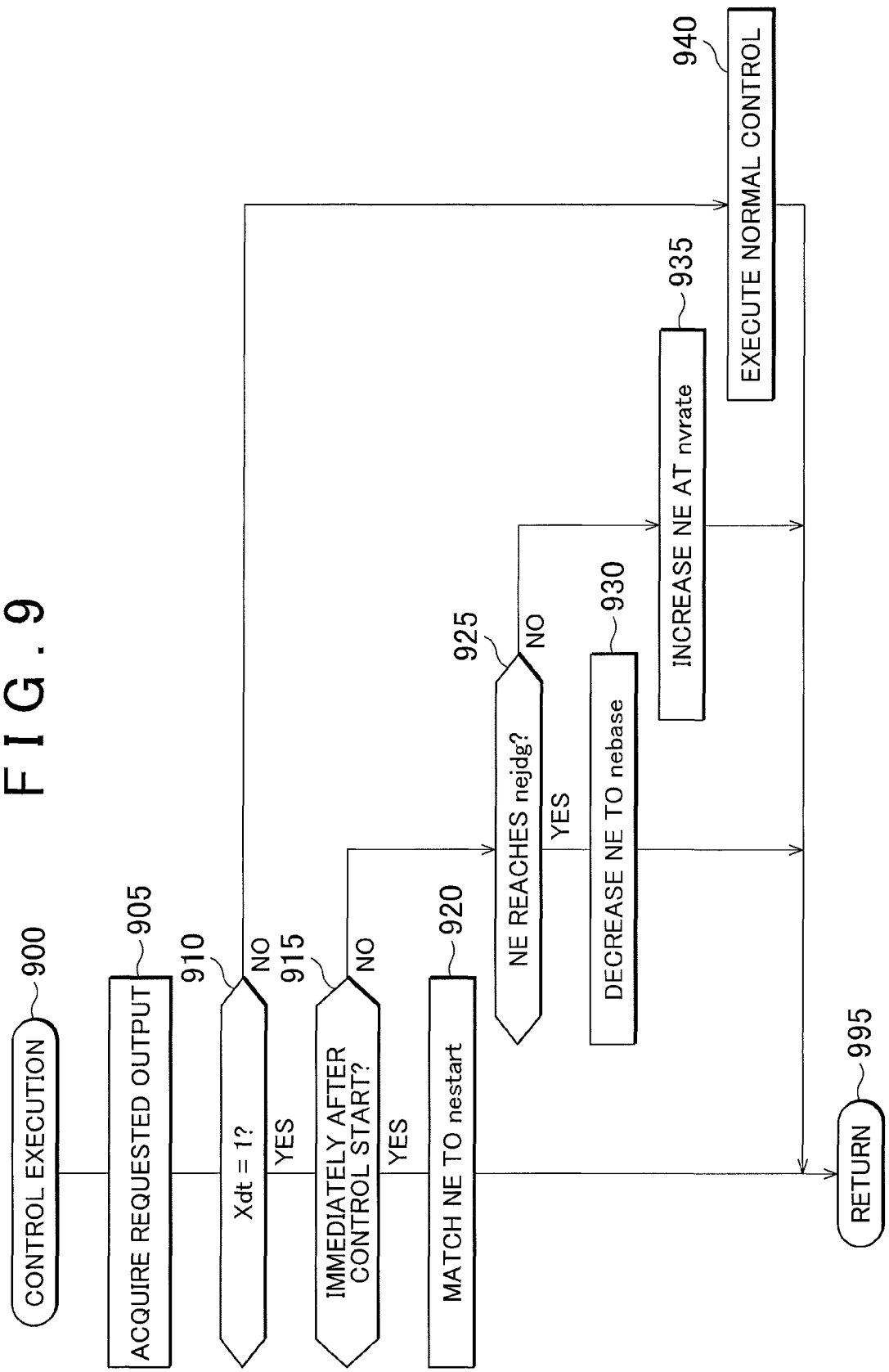
FIG. 9 is a flowchart showing an engine rotation speed increase control execution routine which is executed by the first device.

The CPU is configured to execute a control execution routine shown in the flowchart of FIG. 9 each time a predetermined time elapses.

Accordingly, the CPU starts processing from Step 900 of FIG. 9 at an appropriate timing, progresses to Step 905, and acquires requested torque Treq and requested output Preq for the power distribution mechanism 30 based on the vehicle speed Vs, the accelerator pedal operation amount Ap, and the like. For example, the CPU obtains requested torque and requested output for the vehicle 10 based on the vehicle speed Vs, the accelerator pedal operation amount Ap, and the like, and converts requested torque and requested output to requested torque Treq and requested output Preq based on the gear ratio (shift gear stage) of the stepped variable transmission 51. Requested torque Treq for the vehicle 10 becomes greater as the accelerator pedal operation amount Ap at an arbitrary vehicle speed Vs becomes greater, and becomes smaller as the vehicle speed Vs in an arbitrary accelerator pedal operation amount Ap becomes greater.

Next, the CPU progresses to Step 910 and determines whether or not the value of the control execution flag Xdt is 1. At the moment, the value of the control execution flag Xdt is 0. Accordingly, the CPU determines to be No in Step 910, progresses to Step 940, and controls the engine 20, the first inverter 61, and the second inverter 62. That is, the CPU executes normal traveling control. Therefore, the engine 20 is driven or stopped at the optimum operation point, and the engine 20, the first electric motor MG1, and the second electric motor MG2 are controlled such that requested torque Treq and requested output Preq are satisfied. Thereafter, the CPU progresses to Step 995, and ends this routine once.

(B) A case where the accelerator pedal 91 is greatly depressed. In this case, the accelerator pedal operation amount Ap becomes greater than the control start determination threshold value Apth1. Accordingly, the CPU determines to be Yes in Step 810 of FIG. 8, progresses to Step 815, and determines whether or not an execution allowance condition of the NE increase control is established.

The execution allowance condition of the NE increase control is established, for example, (a) when the remaining quantity of the storage battery 63 is greater than a predetermined threshold value, (b) when the temperature Tm1 of the field winding in the first electric motor MG1 is lower than a predetermined threshold value, and (c) when the temperature Tm2 of the field winding in the second electric motor MG2 is lower than a predetermined threshold value. If the execution allowance condition is established, the CPU determines to be Yes in Step 815, progresses to Step 820, and changes the value of the control execution flag Xdt to 1. If the execution allowance condition is not established, the CPU determines to be No in Step 815, progresses directly to Step 895, and ends this routine once. Accordingly, since the value of the control execution flag Xdt is maintained to 0, processing of Step 940 of FIG. 9 is executed, and normal control is continued.

When the execution allowance condition is established, the CPU progresses to Step 825 after performing processing of Step 820, and acquires initial values of respective parameters (specifically, the increase rate nvrate, the second rotation speed nestart, the pseudo gear shift threshold value nejdg, and the first rotation speed nebase) relating to the NE increase control.

Specifically, the ECU 70 stores the relationship of the accelerator pedal operation amount Ap, the vehicle speed Vs, the gear ratio (shift gear stage) of the stepped variable transmission 51, and the like and the initial values of the increase rate nvrate, the second rotation speed nestart, the pseudo gear shift threshold value nejdg, and the first rotation speed nebase in the ROM in the format of a look-up table. The CPU applies the actual accelerator pedal operation amount Ap, vehicle speed Vs, gear ratio (shift gear stage) of the stepped variable transmission 51, and the like at the time of the start of the NE increase control to the table to determine the initial values of the parameters.

Next, the CPU progresses to Step 830, acquires the vehicle speed Vs at the time of the start of the NE increase control, and acquires the gear shift speed vjdg of the mechanical gear shift occurring next based on the accelerator pedal operation amount Ap and the table shown in FIG. 3.

Next, the CPU progresses to Step 835 and determines (corrects) the value of the increase rate nvrate as an adjustable parameter based on the second rotation speed nestart, the pseudo gear shift threshold value nejdg, the first rotation speed nebase, and the difference Δv between the gear shift speed vjdg and the vehicle speed via at the time of the start of the NE increase control.

As described above, the increase rate nvrate can be set (changed) between the lower limit increase rate nvmin and the upper limit increase rate nvmax (that is, within the allowable range). In this embodiment, the lower limit increase rate nvmin is the value of a predetermined lower limit ratio ad (for example, 90% of an initial value nvint) of the initial value nvint of the increase rate nvrate determined in Step 825. The upper limit increase rate nvmax is the value of a predetermined upper limit ratio au (for example, 110% of the initial value nvint) of the initial value nvint. In addition, the initial value nvint and the predetermined upper limit ratio au are set such that, even if the vehicle speed at the time of the start of the NE increase control is any vehicle speed, when the engine rotation speed NE in the mechanical gear shift (when the vehicle speed Vs becomes the gear shift speed vjdg) occurring next is made to match the pseudo gear shift threshold value nejdg, only two pseudo gear shifts are performed at most before the mechanical gear shift. The initial value nvint and the predetermined upper limit ratio au are set such that only two pseudo gear shifts are performed at most between one mechanical gear shift and a subsequent mechanical gear shift.

In Step 835, first, the CPU first adjusts the increase rate nvrate within the allowable range. With this, the CPU makes the engine rotation speed NE when the vehicle speed Vs becomes the gear shift speed vjdg (next mechanical gear shift) match the pseudo gear shift threshold value nejdg, and determines whether or not the pseudo gear shift can be executed twice (that is, whether or not requirements for two executions are satisfied) until this time.

When the requirements for two executions are satisfied, the CPU uses the adjusted increase rate nvrate as the value of a variable adjustment parameter (an adjustment parameter of the NE increase control which is executed at this time).

When the requirements for two executions are not satisfied, the CPU adjusts (increases or decreases) the increase rate nvrate from the initial value within the allowable range to execute the pseudo gear shift once until the vehicle speed Vs becomes the gear shift speed vjdg, and further determines whether or not the engine rotation speed NE when the vehicle speed Vs becomes the gear shift speed vjdg can be made to match the pseudo gear shift threshold value nejdg (that is, whether or not requirements for one execution are satisfied).

When the requirements for one execution are satisfied, the CPU uses the adjusted increase rate nvrate as the value of a variable adjustment parameter (an adjustment parameter of the NE increase control which is executed at this time).

When the requirements for one execution are not satisfied, the CPU does not execute the pseudo gear shift before the vehicle speed Vs becomes the gear shift speed vjdg (before the mechanical gear shift is executed), and adjusts the increase rate nvrate such that the engine rotation speed NE when the vehicle speed Vs becomes the gear shift speed vjdg matches the pseudo gear shift threshold value nejdg. In this case, the CPU uses the adjusted increase rate nvrate as the value of a variable adjustment parameter (an adjustment parameter of the NE increase control which is executed at this time). When the requirements for one execution are not satisfied, the CPU uses the initial value nvint as the value of a variable adjustment parameter (an adjustment parameter of the NE increase control which is executed at this time). Thereafter, the CPU progresses to Step 895, and ends this routine once.

In this way, if the CPU progresses to Step 910 of FIG. 9 immediately after the value of the control execution flag Xdt is changed from 0 to 1, the CPU determines to be Yes in Step 910 and progresses to Step 915. In Step 915, the CPU determines whether or not it is immediately after the NE increase control is started (that is, whether or not it is immediately after the value of the control execution flag Xdt is changed from 0 to 1).

Immediately after the NE increase control is started, the CPU determines to be Yes in Step 915, progresses to Step 920, and makes the engine rotation speed NE match the second rotation speed nestart. Specifically, the CPU adjusts the engine rotation speed NE by controlling output torque and the rotation speed Nm1 of the first electric motor MG1, the air amount and the fuel injection amount (fuel supply amount) taken into the combustion chamber of the engine 20, and the like. Thereafter, the CPU progresses to Step 995, and ends this routine once.

Thereafter, if the CPU starts the processing from Step 900 of the routine of FIG. 9 in a state where the value of the control execution flag Xdt is maintained to 1, the CPU progresses to Step 915 through Steps 905 and 910. Since this time is not immediately after the NE increase control is started, the CPU determines to be No in Step 915, progresses to Step 925, and determines whether or not the engine rotation speed NE reaches the pseudo gear shift threshold value nejdg. That is, in Step 925, the CPU determines whether or not it is timing for executing the pseudo gear shift. According to the first device, since the mechanical gear shift is also executed when the engine rotation speed NE reaches the pseudo gear shift threshold value nejdg, in Step 925, the CPU also determines whether or not it is timing for executing the mechanical gear shift.

For a while after the engine rotation speed NE is made to match the second rotation speed nestart, the engine rotation speed NE does not reach the pseudo gear shift threshold value nejdg (that is, NE<nejdg). Accordingly, the CPU determines to be No in Step 925, progresses to Step 935, and increases the engine rotation speed NE at the adjusted increase rate nvrate with an increase in the vehicle speed Vs. Specifically, the CPU increases the engine rotation speed NE by controlling output torque and the rotation speed Nm1 of the first electric motor MG1, the air amount and the fuel injection amount (fuel supply amount) taken into the combustion chambers of the engine 20, and the like. Next, the CPU progresses to Step 995. As a result, the engine rotation speed NE is increased so as to be in proportion to the vehicle speed Vs.

Thereafter, if a predetermined time elapses, the engine rotation speed NE reaches the pseudo gear shift threshold value nejdg. In this case, the CPU determines to be Yes in Step 925 of FIG. 9, progresses to Step 930, and executes the pseudo gear shift. That is, the CPU decreases the engine rotation speed NE quickly to the first rotation speed nebase.

Specifically, the CPU decreases the engine rotation speed NE quickly by controlling output torque and the rotation speed Nm1 of the first electric motor MG1, the air amount and the fuel injection amount (fuel supply amount) taken into the combustion chamber of the engine 20, and the like. Next, the CPU progresses to Step 995.

Such processing is repeated, whereby the engine rotation speed NE is increased from the first rotation speed nebase to the pseudo gear shift threshold value nejdg so as to be in proportion to the vehicle speed Vs. Then, when the engine rotation speed NE matches the pseudo gear shift threshold value nejdg, and when the vehicle speed Vs matches the gear shift speed vjdg, the mechanical gear shift is performed. Even when the mechanical gear shift is executed, the CPU performs processing for decreasing the engine rotation speed NE quickly to the first rotation speed nebase (matching the first rotation speed nebase) in the same manner as at the time of the pseudo gear shift.

Though not shown, if the mechanical gear shift is performed, the CPU executes the processing of Steps 825 to 835 of FIG. 8 again. With this, even in a period until the next mechanical gear shift is performed, the NE increase control is executed. As a result, until the next mechanical gear shift is performed, both the engine rotation speed NE generated by the pseudo gear shift and the engine rotation speed NE generated by the next mechanical gear shift can be made to substantially match the pseudo gear shift threshold value nejdg, and both the engine rotation speed NE immediately after the pseudo gear shift and the engine rotation speed NE immediately after the next mechanical gear shift can be made to substantially match the first rotation speed nebase.

Figure 10:
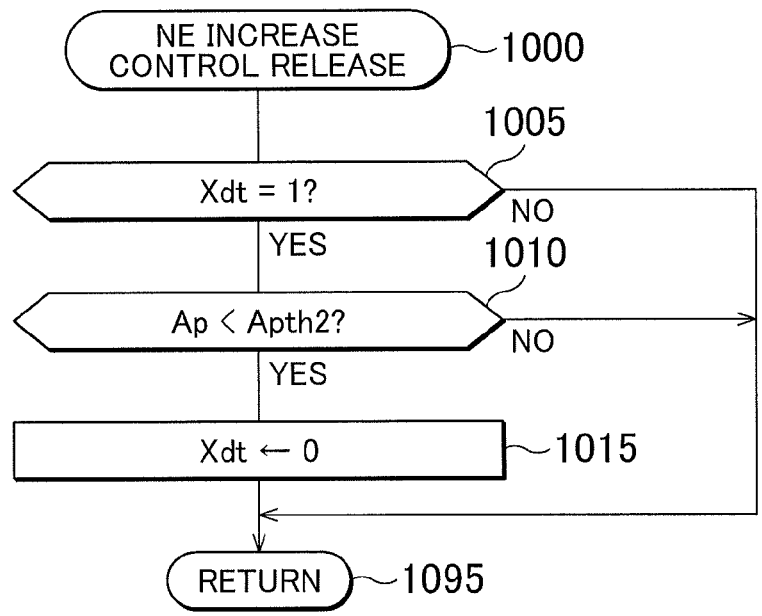
FIG. 10 is a flowchart showing an engine rotation speed increase control release routine which is executed by the first device.

The CPU is configured to execute an NE increase control release routine shown in the flowchart of FIG. 10 each time a predetermined time elapses. Accordingly, the CPU starts processing from Step 1000 of FIG. 10 at an appropriate timing, progresses to Step 1005, and determines whether or not the value of the control execution flag Xdt is 1. If the value of the control execution flag Xdt is not 1 (that is, 0), the CPU determines to be No in Step 1005, progresses directly to Step 1095, and end this routine once.

In contrast, if the value of the control execution flag Xdt is 1, the CPU determines to be Yes in Step 1005, progresses to Step 1010, and determines whether or not the accelerator pedal operation amount Ap is smaller than a predetermined threshold value (control end determination threshold value) Apth2. The control end determination threshold value Apth2 is set to a value equal to or smaller than the control start determination threshold value Apth1 (that is, Apth2≤Apth1).

At this time, if the accelerator pedal operation amount Ap is equal to or greater than the control end determination threshold value Apth2 (that is, if the acceleration request is continued), the CPU determines to be No in Step 1010, progresses directly to Step 1095, and ends this routine once.

In contrast, if the accelerator pedal operation amount Ap is less than the control end determination threshold value Apth2 (that is, if the acceleration request ends), the CPU determines to be Yes in Step 1010, progresses to Step 1015, and sets the value of the control execution flag Xdt to 0. Thereafter, the CPU progresses to Step 1095, and ends this routine once.

In this way, if the accelerator pedal operation amount Ap is less than the control end determination threshold value Apth2 in a state where the value of the control execution flag Xdt is 1, the value of the control execution flag Xdt is returned to 0. As a result, the CPU determines to be No in Step 910 of FIG. 9, and progresses to Step 940, therefore, the NE increase control ends, and the normal control is executed.

As described above, the first device according to the first embodiment is applied to the vehicle (10) including the internal combustion engine 20, the continuously variable transmission (power distribution mechanism 30, planetary gear device 31) which has the first input shaft (planetary carrier 35), which is rotationally driven by the internal combustion engine, and the first output shaft (ring carrier 36), and is configured to continuously change the first gear ratio which is the ratio of the rotation speed of the first input shaft to the rotation speed of the first output shaft (see the nomographic chart of FIG. 2 and Expression (1)), and the stepped variable transmission (51) which has the second input shaft (input shaft 51*a*) connected to the first output shaft, and the second output shaft (output shaft 51*b*) connected to the driving wheel (54) so as to transmit torque, and is configured to change the second gear ratio, which is the ratio of the rotation speed of the second input shaft to the rotation speed of the second output shaft, in a stepwise manner (see the gear shift diagram shown in FIG. 3). In the control device for a vehicle including the control unit (the ECU 70) which controls the rotation speed of the internal combustion engine and the second gear ratio, the control unit controls the rotation speed of the internal combustion engine in a period during which the vehicle is accelerated according to the acceleration request to the vehicle (a period during which the value of the control execution flag Xdt is 1) such that the rotation speed of the internal combustion engine is increased with an increase in the traveling speed of the vehicle. When the rotation speed of the internal combustion engine reaches the predetermined pseudo gear shift threshold value nejdg, the control unit executes the pseudo gear shift to control the rotation speed of the internal combustion engine such that the rotation speed of the internal combustion engine is decreased to the predetermined first rotation speed nebase (see Steps 825 to 835 of FIGS. 4B, 5 to 7, and 8, Steps 920 and 925 to 935 of FIG. 9). The control unit is configured to further execute the mechanical gear shift to change the second gear ratio according to the gear shift line which is determined by the traveling speed (Vs) of the vehicle and the value (Ap) according to the acceleration request (the ECU 70, see FIG. 3). In addition, the control unit is configured to execute the adjustment control (control for adjusting the value of the increase rate nvrate as the adjustable parameter) to adjust the rotation speed of the internal combustion engine in advance in a period before the mechanical gear shift is performed such that the rotation speed of the internal combustion engine matches the pseudo gear shift threshold value nejdg when the mechanical gear shift is performed (see Step 835 of FIGS. 4 to 7, and 8, and Step 935 of FIG. 9).

The continuously variable transmission (power distribution mechanism 30, planetary gear device 31) is the power distribution mechanism in which the output shaft (output shaft 42) of the electric motor (second electric motor MG2) in the vehicle is connected to the first output shaft (ring carrier 36) so as to transmit torque, and the control unit (the ECU 70) is configured to control the electric motor.

The first device is configured to realize the adjustment control by adjusting the increase rate (nvrate) which is the ratio of the unit increase amount of the rotation speed of the first input shaft to the unit increase amount of the rotation speed of the first output shaft (see Step 835 of FIG. 8 and Step 935 of FIG. 9).

According to the first device, an increase in the engine rotation speed NE with an increase in the vehicle speed Vs and the pseudo gear shift (a decrease in the engine rotation speed NE) are repeated at a substantially regular interval in terms of vehicle speed Vs. In addition, the engine rotation speed NE at the time of the start of the pseudo gear shift and the engine rotation speed NE at the time of the start of the mechanical gear shift substantially become the same value (pseudo gear shift threshold value nejdg). In addition, the engine rotation speed NE immediately after the pseudo gear shift and the engine rotation speed NE immediately after the mechanical gear shift substantially become the same value (first rotation speed nebase). As a result, the driver of the vehicle 10 does not feel a sense of discomfort during acceleration and can obtain a satisfactory sense of acceleration.

Next, a modification example of the first embodiment will be described. A CPU according to the modification example executes a redetermination routine of an adjustment parameter shown in FIG. 11 in addition to the routines shown in FIGS. 8 to 10 each time a predetermined time elapses.

Figure 11:
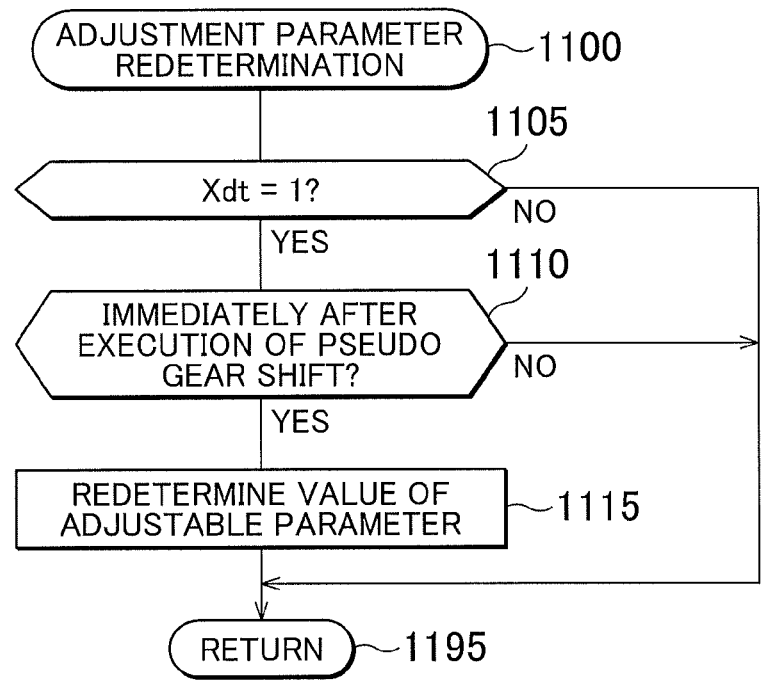
FIG. 11 is a flowchart showing an adjustment parameter redetermination routine which is executed by the first device.

Accordingly, the CPU starts processing from Step 1100 of FIG. 11 at an appropriate timing, progresses to Step 1105, and determines whether or not the value of the control execution flag Xdt is 1.

When the NE increase control is being executed and it is immediately after the pseudo gear shift is executed, the value of the control execution flag Xdt is 1. For this reason, the CPU determines to be Yes in Step 1105, progresses to Step 1110, and determines whether or not it is immediately after the pseudo gear shift is executed.

In the above-described case, since it is immediately after the pseudo gear shift is executed, the CPU determines to be Yes in Step 1110, progresses to Step 1115, and determines the value of an adjustable parameter again. Specifically, the CPU determines the value of the increase rate nvrate as an adjustable parameter by executing the same processing as Step 835 of FIG. 8. Next, the CPU progresses to Step 895, and ends this routine once.

If the NE increase control is not being executed, the CPU determines to be No in Step 1105, and progresses directly to Step 1195. In addition, if it is not immediately after the pseudo gear shift processing is executed, the CPU determines to be No in Step 1110, and progresses directly to Step 1195.

According to this modification example, an adjustable parameter (in this example, the increase rate nvrate) is determined again each time the gear shift processing is executed. Therefore, even when the gear shift speed vjdg is changed due to a reason, such as a change in the accelerator pedal operation amount Ap in a period during which the NE increase control is executed, the engine rotation speed NE can be made to match the pseudo gear shift threshold value nejdg more reliably at the timing when the mechanical gear shift is executed.

Next, a control device (hereinafter, referred to as a second device) for a vehicle according to a second embodiment of the invention will be described. The first device described above adjusts the values of the increase rate nvrate as an adjustable parameter when executing the NE increase control. In contrast, the second device is different from the first device in that the second rotation speed nestart is adjusted as an adjustable parameter. Hereinafter, description will be provided focusing on the difference. In the following description, an ECU of the second device corresponding to the ECU 70 of the first device is referred to as an ECU 71.

The second rotation speed nestart can be set (changed) between a lower limit start rotation speed nesmin and an upper limit start rotation speed nesmax (that is, within an allowable range). That is, the ECU 71 sets the second rotation speed nestart while limiting the second rotation speed nestart within the allowable range such that the engine rotation speed NE when the mechanical gear shift processing is executed matches the engine rotation speed NE (that is, the pseudo gear shift threshold value nejdg) when the pseudo gear shift processing is executed. The upper limit start rotation speed nesmax is a value between the pseudo gear shift threshold value nejdg and the first rotation speed nebase. In addition, as shown in FIGS. 13, 14, and the like, the difference d1 between the first rotation speed nebase and the lower limit start rotation speed nesmin is substantially equal to the difference d2 between the upper limit start rotation speed nesmax and the first rotation speed nebase (that is, nebase−nesmin≡nesmax−nebase).

Figure 12:
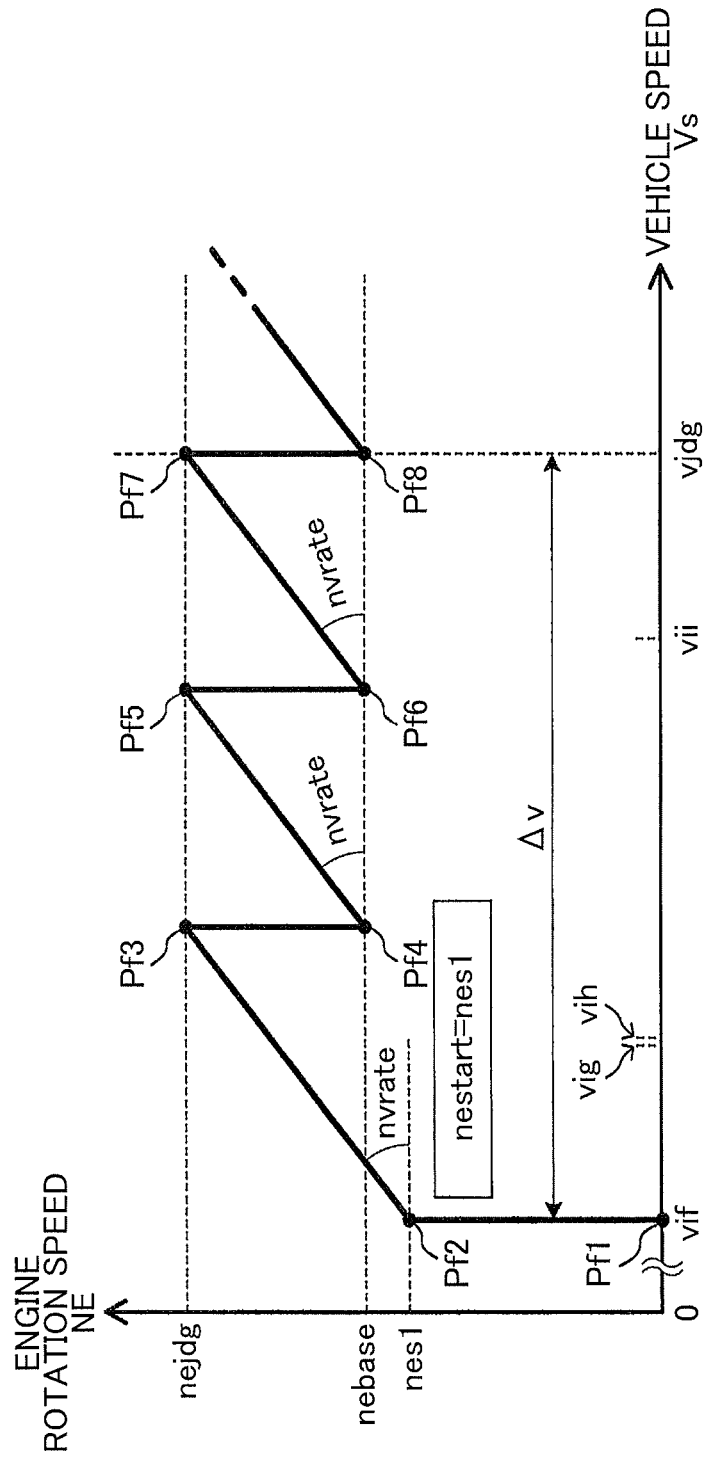
FIG. 12 is a graph showing a state of engine rotation speed increase control which is executed by a control device (second device) according to a second embodiment.

For example, in an example shown in FIG. 12, the difference Δv between the gear shift speed vjdg and an NE increase control start vehicle speed vif is comparatively great. In this case, the ECU 71 executes two pseudo gear shifts (see operation points Pf3 and Pf5) before the mechanical gear shift (see an operation point Pf7), and sets the value of the second rotation speed nestart to an engine rotation speed nest such that the engine rotation speed NE in the mechanical gear shift (see the operation point Pf7) is made to match the pseudo gear shift threshold value nejdg.

Figure 13:
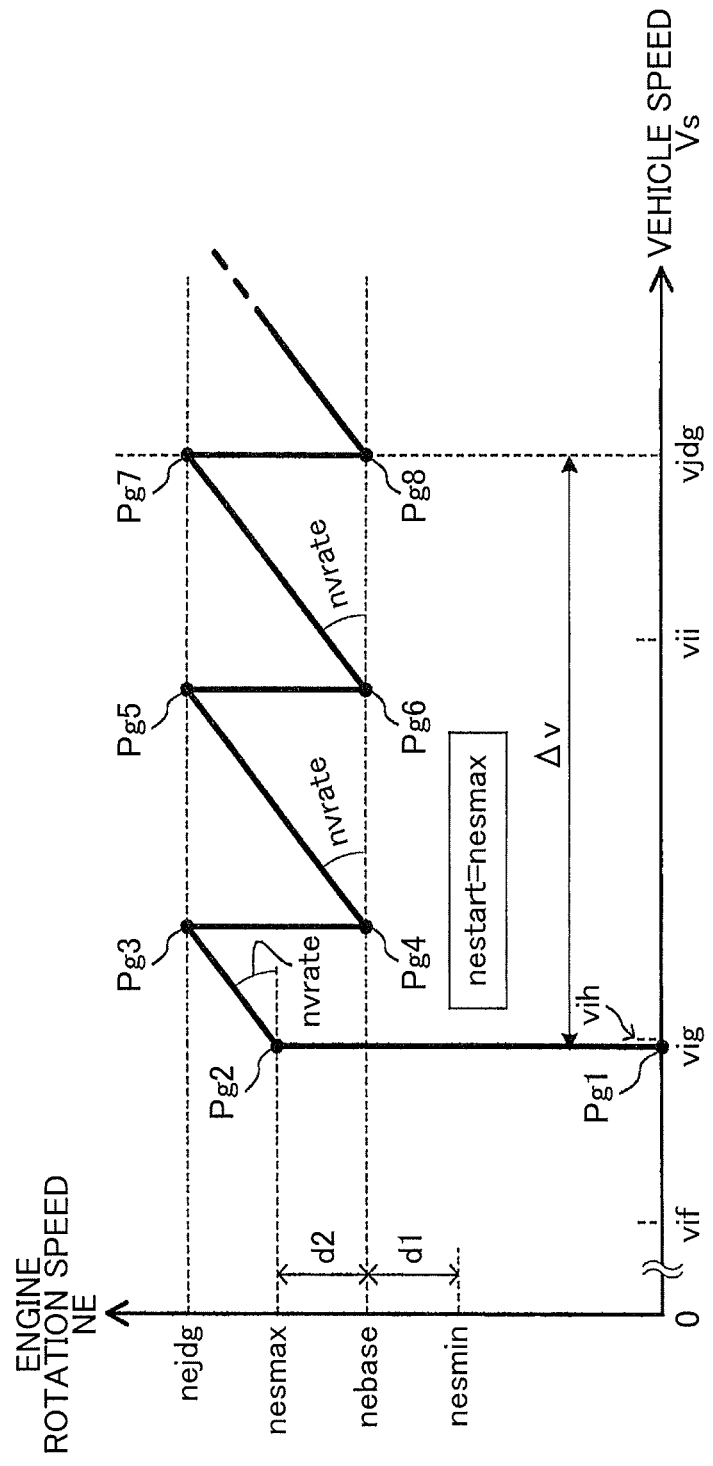
FIG. 13 is a graph showing a state of the engine rotation speed increase control which is executed by the second device.
Figure 14:
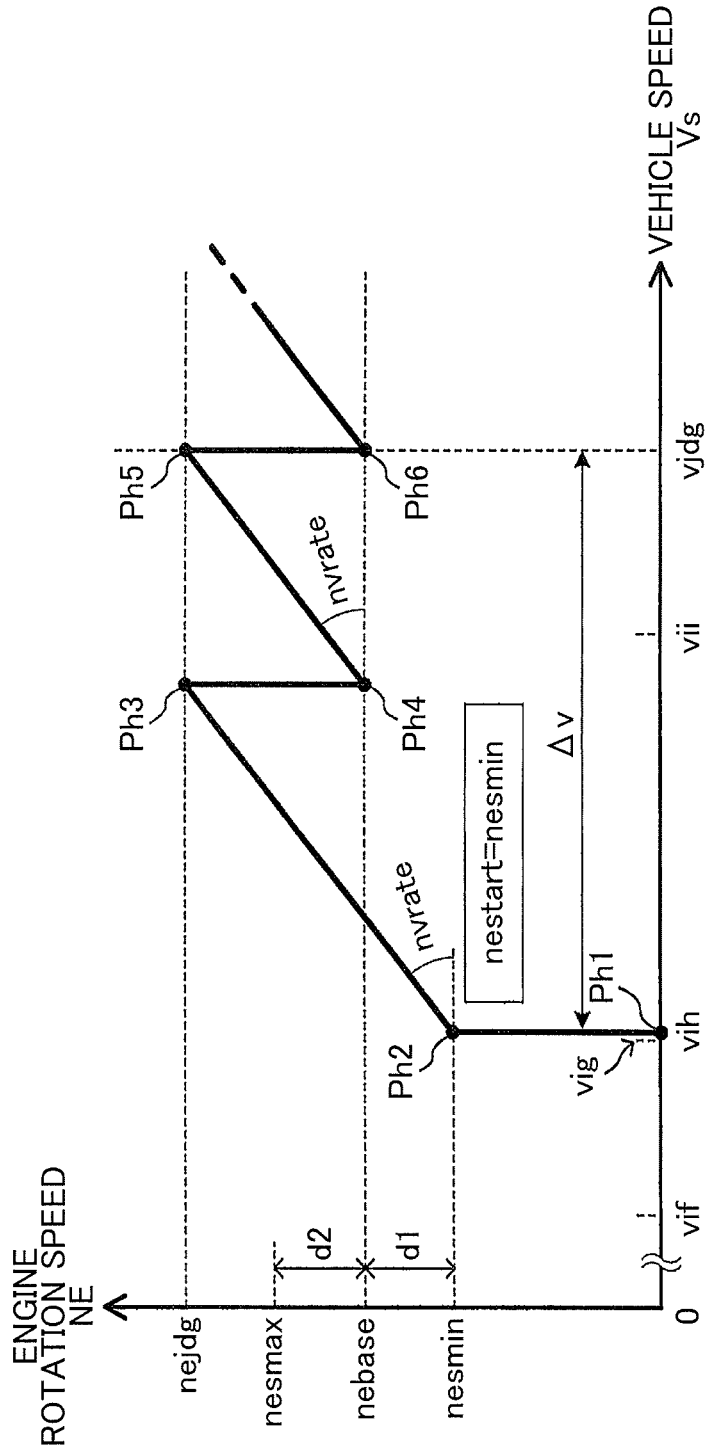
FIG. 14 is a graph showing a state of the engine rotation speed increase control which is executed by the second device.

FIG. 13 shows a case where the NE increase control start vehicle speed is a vehicle speed vig higher than the vehicle speed vif, and the difference Δv between the gear shift speed vjdg and the NE increase control start vehicle speed vig is smaller than in the example shown in FIG. 12; for this reason, the ECU 71 sets the value of the second rotation speed nestart to the upper limit start rotation speed nesmax, executes two pseudo gear shift (see operation points Pg3 and Pg5) before the mechanical gear shift (see an operation point Pg7), and makes the engine rotation speed NE in the mechanical gear shift (see the operation point Pg7) match the pseudo gear shift threshold value nejdg.

If the difference Δv becomes smaller, even when the value of the second rotation speed nestart is set to the upper limit start rotation speed nesmax, two pseudo gear shifts to the mechanical gear shift cannot be performed. Accordingly, as shown in FIG. 14, the ECU 71 makes the value of the second rotation speed nestart small to decrease the number of pseudo gear shifts occurring before the mechanical gear shift. As a result, the time from the start of the NE increase control (see an operation point Ph1) to the initial pseudo gear shift (see an operation point Ph3) can be extended. Accordingly, since the pseudo gear shift does not occur immediately after the start of the NE increase control, it is possible to avoid a sense of discomfort to the driver.

Specifically, in an example shown in FIG. 14, the NE increase control start vehicle speed is a vehicle speed vih slightly higher than the vehicle speed vig, and the difference Δv between the gear shift speed vjdg and the NE increase control start vehicle speed vih is slightly smaller than in the example shown in FIG. 13. For this reason, the ECU 71 sets the value of the second rotation speed nestart to the lower limit start rotation speed nesmin and executes one pseudo gear shift (see the operation point Ph3) before the mechanical gear shift (see an operation point Ph5).

Figure 15:
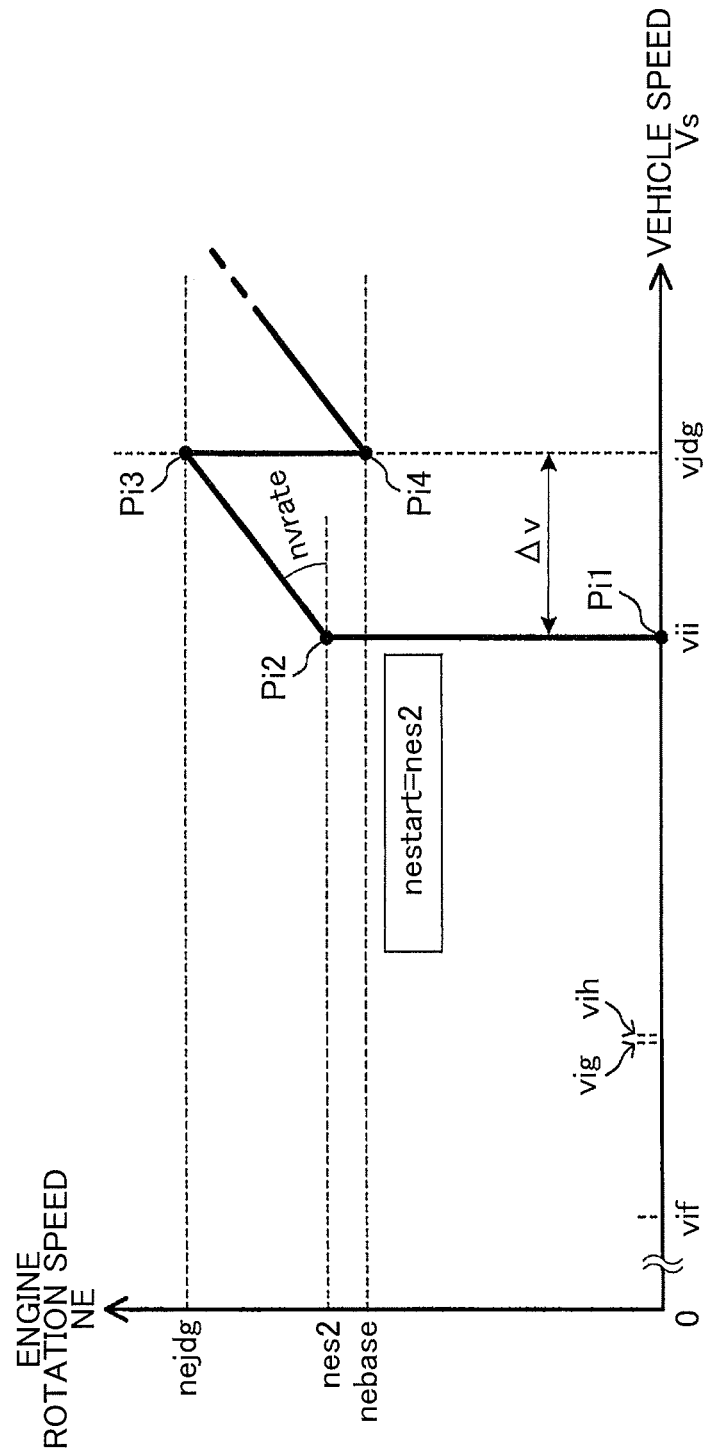
FIG. 15 is a graph showing a state of the engine rotation speed increase control which is executed by the second device.

In an example shown in FIG. 15, the NE increase control start vehicle speed is a vehicle speed vii higher than the vehicle speed vih, and the difference Δv between the gear shift speed vjdg and the NE increase control start vehicle speed vii is smaller than in the example shown in FIG. 14. In this case, even if the value of the second rotation speed nestart is set to the upper limit start rotation speed nesmax, the ECU 71 cannot execute the pseudo gear shift even once before the mechanical gear shift (see an operation point Pi3). Accordingly, the ECU 71 sets the value of the second rotation speed nestart to an engine rotation speed nes2, and makes the engine rotation speed NE in the mechanical gear shift (see the operation point Pi3) match the pseudo gear shift threshold value nejdg.

In order to perform such NE increase control, the ECU 71 executes the routines shown in FIGS. 8 to 10 in the same manner as the ECU 70 of the first device. However, when executing Step 835 of FIG. 8, the CPU of the ECU 71 determines the second rotation speed nestart, instead of the increase rate nvrate, as the value of an adjustable parameter.

Even when the second rotation speed nestart is set to the upper limit start rotation speed nesmax, the pseudo gear shift threshold value nejdg, the first rotation speed nebase, and the increase rate nvrate are set such that only two pseudo gear shifts can be executed at most before the mechanical gear shift occurring next. Accordingly, in Step 835, the CPU first adjusts the second rotation speed nestart within the allowable range to make the engine rotation speed NE when the vehicle speed Vs becomes the gear shift speed vjdg (at the time of the next mechanical gear shift) match the pseudo gear shift threshold value nejdg, and determines whether or not the pseudo gear shift can be executed twice (that is, whether or not the requirements for two executions are satisfied) until this time.

When the requirements for two executions are satisfied, the CPU uses the adjusted second rotation speed nestart as the value of a variable adjustment parameter (an adjustment parameter of the NE increase control which is executed at this time).

When the requirements for two executions are not satisfied, the CPU adjusts (increases or decreases) the second rotation speed nestart from the initial value within the allowable range to execute the pseudo gear shift once until the vehicle speed Vs becomes the gear shift speed vjdg, and further determines whether or not the engine rotation speed NE when the vehicle speed Vs becomes the gear shift speed vjdg can be made to match the pseudo gear shift threshold value nejdg (that is, whether or not the requirements for one execution are satisfied).

When the requirements for one execution are satisfied, the CPU uses the adjusted second rotation speed nestart as the value of a variable adjustment parameter (an adjustment parameter of the NE increase control which is executed at this time).

When the requirements for one execution are not satisfied, the CPU does not execute the pseudo gear shift before the vehicle speed Vs becomes the gear shift speed vjdg (before the mechanical gear shift is executed), and adjusts the second rotation speed nestart such that the engine rotation speed NE when the vehicle speed Vs becomes the gear shift speed vjdg matches the pseudo gear shift threshold value nejdg. In this case, the CPU uses the adjusted second rotation speed nestart as the value of a variable adjustment parameter (an adjustment parameter of the NE increase control which is executed at this time).

As described above, the second device is configured such that the control unit (the ECU 71) realizes the adjustment control by adjusting the second rotation speed (nestart) which is the rotation speed of the internal combustion engine at the acceleration start time when the vehicle starts to be accelerated based on the acceleration request to the vehicle.

According to the second device, the second rotation speed (nestart) which is the engine rotation speed NE at the acceleration start time is adjusted, whereby the engine rotation speed NE at the time of the start of the pseudo gear shift and the engine rotation speed NE at the time of the start of the mechanical gear shift can be made to be substantially the same (the pseudo gear shift threshold value nejdg), and the engine rotation speed NE immediately after the pseudo gear shift and the engine rotation speed NE immediately after the mechanical gear shift can be made to be substantially the same (the first rotation speed nebase). As a result, the driver of the vehicle 10 does not feel a sense of discomfort during acceleration and can obtain a satisfactory sense of acceleration.

Next, a control device (hereinafter, referred to as a third device) for a vehicle according to a third embodiment of the invention will be described. The first device described above adjusts the value of the increase rate nvrate as an adjustable parameter when executing the NE increase control. In contrast, the third device is different from the first device in that the first rotation speed nebase is adjusted as an adjustable parameter. Hereinafter, description will be provided focusing on the difference. In the following description, an ECU of the third device corresponding to the ECU 70 of the first device is referred to as an ECU 72.

Figure 17:
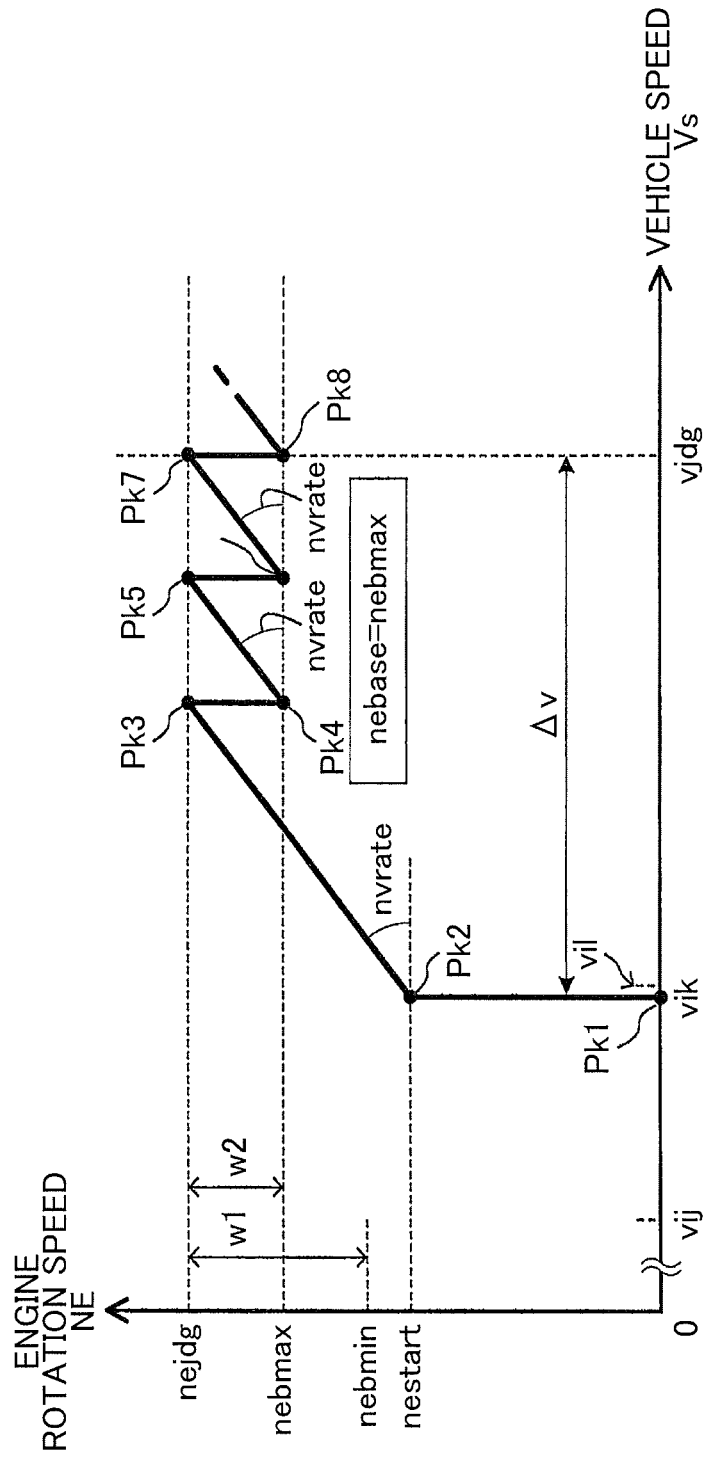
FIG. 17 is a graph showing a state of the engine rotation speed increase control which is executed by the third device.
Figure 18:
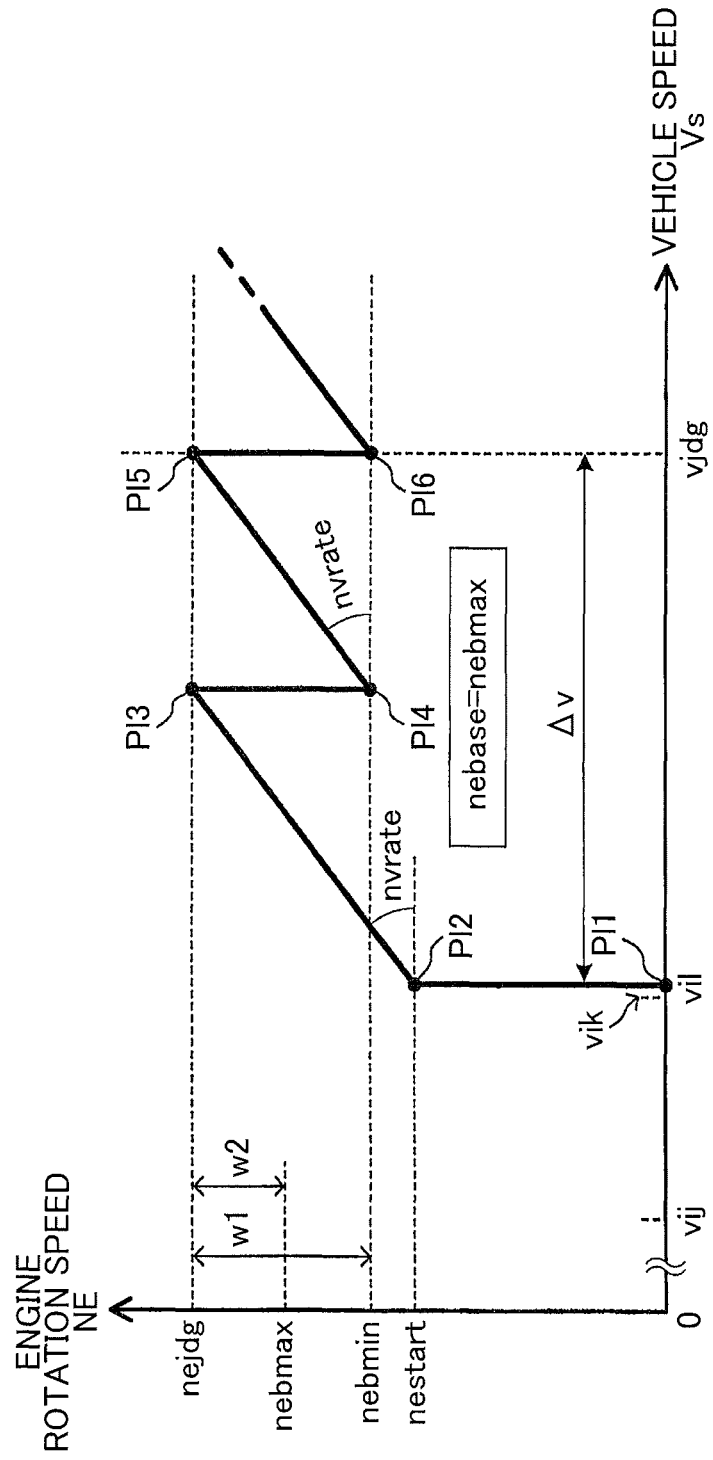
FIG. 18 is a graph showing a state of the engine rotation speed increase control which is executed by the third device.

The first rotation speed nebase can be set (changed) between a lower limit post-gear shift rotation speed nebmin and an upper limit post-gear shift rotation speed nebmax (that is, within an allowable range). This will be specifically described referring to FIGS. 16 to 18. That is, the ECU 72 sets the first rotation speed nebase while limiting the first rotation speed nebase within the allowable range such that the engine rotation speed NE when the mechanical gear shift processing is executed matches the engine rotation speed NE (that is, the pseudo gear shift threshold value nejdg) when the pseudo gear shift processing is executed. As shown in FIGS. 17, 18, and the like, the difference w1 between the pseudo gear shift threshold value nejdg and the lower limit post-gear shift rotation speed nebmin is substantially two times greater than the difference w2 between the pseudo gear shift threshold value nejdg and the upper limit post-gear shift rotation speed nebmax (that is, nejdg−nebmin≅(nejdg−nebmax)×2).

The driver can obtain a more satisfactory sense of accelerating by making as many pseudo gear shifts as possible occur before the mechanical gear shift. However, if the value of the first rotation speed nebase is too close to the pseudo gear shift threshold value nejdg, the pseudo gear shift is frequently repeated, and the driver may feel a sense of discomfort. The upper limit post-gear shift rotation speed nebmax is provided so as to avoid this situation. If the first rotation speed nebase is too low, the difference between the pseudo gear shift threshold value nejdg and the first rotation speed nebase becomes too great, and fluctuation in the engine rotation speed at the time of the pseudo gear shift becomes too great. As a result, the driver may feel a sense of discomfort. The lower limit post-gear shift rotation speed nebmin is provided so as to avoid this situation.

Figure 16:
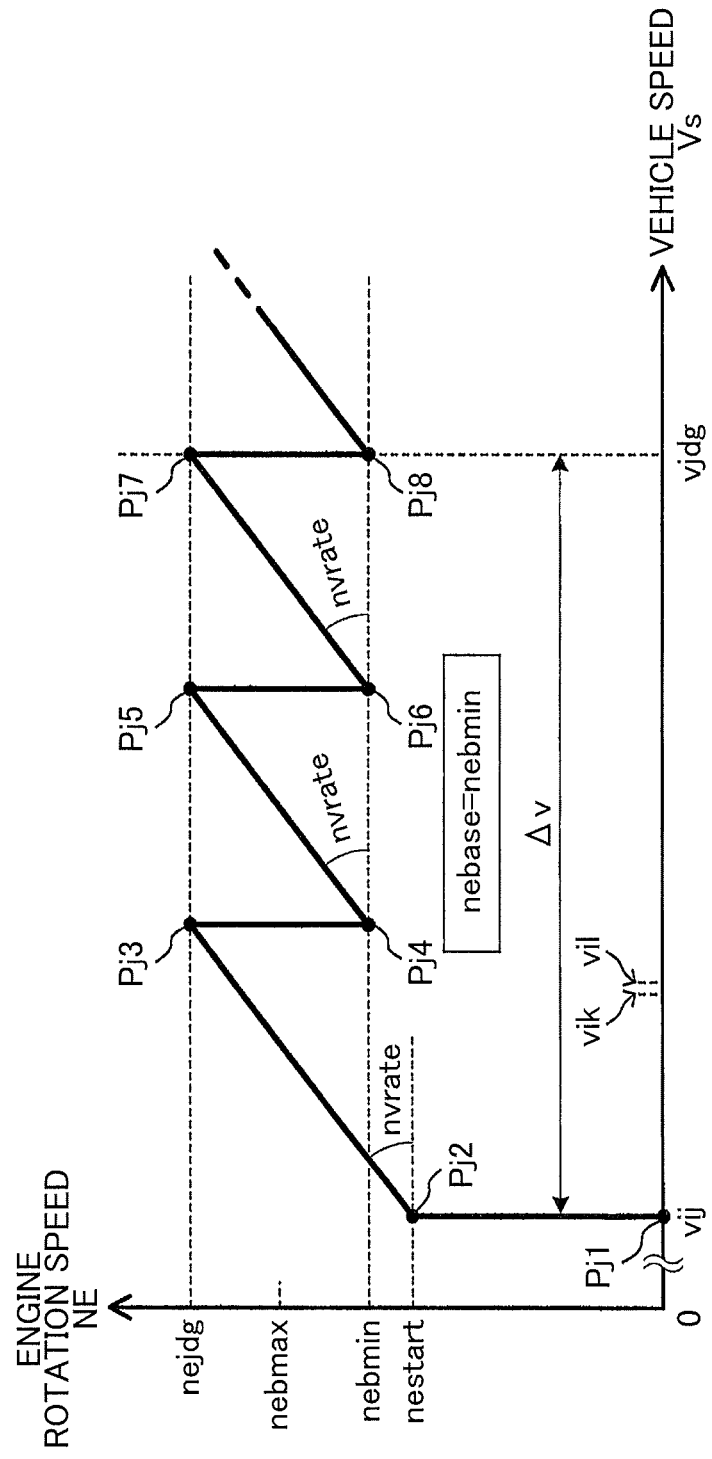
FIG. 16 is a graph showing a state of engine rotation speed increase control which is executed by a control device (third device) according to a third embodiment.

FIG. 16 shows a case where the difference Δv between the gear shift speed vjdg and the NE increase control start vehicle speed vij is comparatively great; thus, the ECU 72 executes two pseudo gear shifts (see operation points Pj3 and Pj5) before the mechanical gear shift (see an operation point Pj7), and sets the value of the first rotation speed nebase to the lower limit post-gear shift rotation speed nebmin such that the engine rotation speed NE in the mechanical gear shift (see the operation point Pj7) is made to match the pseudo gear shift threshold value nejdg.

FIG. 17 shows a case where the NE increase control start vehicle speed is a vehicle speed vile higher than the vehicle speed vij, and the difference Δv between the gear shift speed vjdg and the NE increase control start vehicle speed vig is smaller than in the example shown in FIG. 16; for this reason, the ECU 72 sets the value of the first rotation speed nebase to the upper limit post-gear shift rotation speed nebmax, executes two pseudo gear shifts (see operation points Pk3 and Pk5) before the mechanical gear shift (see an operation point Pk7), and makes the engine rotation speed NE in the mechanical gear shift (see the operation point Pk7) match the pseudo gear shift threshold value nejdg.

If the difference Δv becomes smaller, the ECU 72 decreases the number of pseudo gear shifts occurring before the mechanical gear shift, and widens the interval between the pseudo gear shifts relating to the vehicle speed Vs. In other words, even if the value of the first rotation speed nebase is set to the upper limit post-gear shift rotation speed nebmax, two pseudo gear shifts cannot be performed before the mechanical gear shift. Accordingly, as shown in FIG. 18, the ECU 71 sets the value of the first rotation speed nebase to the lower limit post-gear shift rotation speed nebmin, and executes one pseudo gear shift (see an operation point P13) before the mechanical gear shift (see an operation point P15).

In order to perform such NE increase control, the ECU 72 executes the routines shown in FIGS. 8 to 10 in the same manner as the ECU 70 of the first device. However, a CPU of the ECU 72 (hereinafter, referred to as a CPU) determines the first rotation speed nebase, instead of the increase rate nvrate, as the value of an adjustable parameter when executing Step 835 of FIG. 8.

On the other hand, even when the first rotation speed nebase is set to the upper limit post-gear shift rotation speed nebmax, the pseudo gear shift threshold value nejdg, the second rotation speed nestart, and the increase rate nvrate are set such that only two pseudo gear shifts can be executed at most before the mechanical gear shift occurring next. Accordingly, in Step 835, the CPU first adjusts the first rotation speed nebase within the allowable range to make the engine rotation speed NE when the vehicle speed Vs becomes the gear shift speed vjdg (at the time of the next mechanical gear shift) match the pseudo gear shift threshold value nejdg, and determines whether or not the pseudo gear shift can be executed twice (that is, whether or not the requirements for two executions are satisfied).

When the requirements for two executions are satisfied, the CPU uses the adjusted first rotation speed nebase as the value of a variable adjustment parameter (an adjustment parameter of the NE increase control which is executed at this time).

When the requirements for two executions are not satisfied, the CPU adjusts (increases or decreases) the first rotation speed nebase from the initial value within the allowable range to execute the pseudo gear shift once until the vehicle speed Vs becomes the gear shift speed vjdg, and further determines whether or not the engine rotation speed NE when the vehicle speed Vs becomes the gear shift speed vjdg can be made to match the pseudo gear shift threshold value nejdg (that is, whether or not the requirements for one execution are satisfied).

When the requirements for one execution are satisfied, the CPU uses the adjusted first rotation speed nebase as the value of a variable adjustment parameter (an adjustment parameter of the NE increase control which is executed at this time).

When the requirements for one execution are not satisfied, the CPU cannot execute the pseudo gear shift before the vehicle speed Vs becomes the gear shift speed vjdg (before the mechanical gear shift is executed); therefore, the CPU uses the initial value of the first rotation speed nebase as the value of a variable adjustment parameter (an adjustment parameter of the NE increase control which is executed at this time).

As described above, the third device is configured such that the control unit (the ECU 72) realizes the adjustment control by adjusting the first rotation speed.

According to the third device, when the pseudo gear shift is executed before the mechanical gear shift is executed, the first rotation speed nebase which is the engine rotation speed NE after the execution of the pseudo gear shift is adjusted, whereby the engine rotation speed NE at the time of the start of the pseudo gear shift and the engine rotation speed NE at the time of the start of the mechanical gear shift can be made to be substantially the same (the pseudo gear shift threshold value nejdg), and the engine rotation speed NE immediately after the pseudo gear shift and the engine rotation speed NE immediately after the mechanical gear shift can be made to be substantially the same (the first rotation speed nebase). As a result, the driver of the vehicle 10 does not feel a sense of discomfort during acceleration and can obtain a satisfactory sense of acceleration.

Next, a control device (hereinafter, referred to as a fourth device) for a vehicle according to a fourth embodiment of the invention will be described. The first device described above adjusts only the value of the increase rate nvrate as an adjustable parameter when executing the NE increase control. In contrast, the fourth device is different from the first device in that three parameters of the increase rate nvrate, the second rotation speed nestart, and the first rotation speed nebase are adjusted as an adjustable parameter. Hereinafter, description will be provided focusing on the difference. In the following description, an ECU of the fourth device corresponding to the ECU 70 of the first device is referred to as an ECU 73.

In order to execute the NE increase control, a CPU of the ECU 73 (hereinafter, simply referred to as a CPU) executes the routines shown in FIGS. 8 to 10 in the same manner as the ECU 70 of the first device. However, the CPU determines the increase rate nvrate, the second rotation speed nestart, and the first rotation speed nebase as adjustable parameters when executing Step 835 of FIG. 8.

As described in the first to third embodiments, each of the parameters can only be adjusted within the allowable range. However, the allowable range of the increase rate nvrate is narrower than the allowable range in the first embodiment, the allowable range of the second rotation speed nestart is narrower than the allowable range in the second embodiment, and the allowable range of the first rotation speed nebase is narrower than the allowable range in the third embodiment.

In Step 835, the CPU determines the increase rate nvrate, the second rotation speed nestart, and the first rotation speed nebase according to the rules described below.

(1) The CPU changes the value of each adjustable parameter within the corresponding allowable range such that as many pseudo gear shifts as possible (twice at most) occur before the next mechanical gear shift.

(2) The CPU first adjusts only the increase rate nvrate, determines whether or not two pseudo gear shifts are possible before the next mechanical gear shift, and if possible, uses the value of the adjusted increase rate nvrate, and the initial value of the second rotation speed nestart and the initial value of the first rotation speed nebase acquired in Step 825 as the values of variable adjustment parameters.

(3) When two pseudo gear shifts are impossible before the mechanical gear shift with the adjustment of only the increase rate nvrate, the CPU adjusts the second rotation speed nestart and/or the first rotation speed nebase in addition to the increase rate nvrate. (4) As a result of (3) described above, if two pseudo gear shifts are possible before the next mechanical gear shift, the CPU uses the adjusted increase rate nvrate, second rotation speed nestart, and the first rotation speed nebase as the values of variable adjustment parameters.

(5) As a result of (3) described above, if two pseudo gear shifts are impossible before the next mechanical gear shift, the CPU adjusts only the increase rate nvrate, determines whether or not one pseudo gear shift is possible before the next mechanical gear shift, and if possible, uses the value of the adjusted increase rate nvrate, and the initial value of the second rotation speed nestart and the initial value of the first rotation speed nebase acquired in Step 825 as the values of variable adjustment parameters.

(6) When one pseudo gear shift is impossible before the next mechanical gear shift with the adjustment of only the increase rate nvrate, the CPU adjusts the second rotation speed nestart and/or the first rotation speed nebase in addition to the increase rate nvrate. (7) As a result of (6) described above, if one pseudo gear shift is possible before the next mechanical gear shift, the values of the adjusted increase rate nvrate, second rotation speed nestart, and first rotation speed nebase are used as the values of variable adjustment parameters.

(8) As a result of (7) described above, if one pseudo gear shift is impossible before the next mechanical gear shift, the CPU adjusts only the increase rate nvrate, does not perform the pseudo gear shift before the next mechanical gear shift, and determines whether or not the engine rotation speed NE at the time of the mechanical gear shift can be made to match the pseudo gear shift threshold value nejdg. (9) As a result of (8) described above, if the engine rotation speed NE at the time of the mechanical gear shift can be made to match the pseudo gear shift threshold value nejdg, the value of the adjusted increase rate nvrate, and the initial value of the second rotation speed nestart and the initial value of the first rotation speed nebase acquired in Step 825 are used as the values of variable adjustment parameters.

(10) As a result of (8) described above, if the engine rotation speed NE at the time of the mechanical gear shift cannot be made to match the pseudo gear shift threshold value nejdg, the CPU adjusts the second rotation speed nestart in addition to the increase rate nvrate. (11) As a result of (10) described above, if the engine rotation speed NE at the time of the mechanical gear shift can be made to match the pseudo gear shift threshold value nejdg, the CPU uses the value of the adjusted increase rate nvrate and the value of the adjusted second rotation speed nestart as the values of variable adjustment parameters. (12) As a result of (10) described above, if the engine rotation speed NE at the time of the mechanical gear shift cannot be made to match the pseudo gear shift threshold value nejdg, the CPU uses the initial values of the respective adjustable parameters acquired in Step 825 as the values of variable adjustment parameters.

As described above, the fourth device is a control device which is configured such that the control unit (the ECU 73) realizes the adjustment control by adjusting at least two of the increase rate (nvrate) which is the ratio of the unit increase amount of the rotation speed of the first input shaft to the unit increase amount of the rotation speed of the first output shaft, the first rotation speed (nebase), and the second rotation speed (nestart) which is the rotation speed of the internal combustion engine at the acceleration start time when the vehicle starts to be accelerated based on the acceleration request to the vehicle.

The fourth device can have the effects of the first to third devices. In addition, according to the fourth device, the adjustment control is realized by adjusting a plurality of parameters (adjustable parameters); therefore, it is possible to avoid any parameter becoming too great or too small. As a result, it is possible to reliably avoid a sense of discomfort to the driver. The fourth device may use only an arbitrary combination of two of the increase rate nvrate, the second rotation speed nestart, and the first rotation speed nebase.

Although the embodiments of the control device for a vehicle according to the invention have been described, the invention is not limited to the foregoing embodiments, and various changes can be made without departing from the purpose of the invention. For example, in the respective embodiments, the accelerator pedal operation amount Ap is used as the value according to the acceleration request. However, instead of the accelerator pedal operation amount Ap or in addition to the accelerator pedal operation amount Ap, the depression speed of the accelerator pedal 91 may be used as the value according to the acceleration request.

In addition, in the first embodiment, the allowable range of the increase rate nvrate may be changed according to the acceleration request. For example, the upper limit increase rate nvmax may be increased as the acceleration request becomes greater. Alternatively, in the second embodiment, the allowable range of the second rotation speed nestart may be changed according to the acceleration request. For example, the upper limit start rotation speed nesmax may be increased as the acceleration request becomes greater. Alternatively, in the third embodiment, the allowable range of the first rotation speed nebase may be changed according to the acceleration request. For example, the upper limit post-gear shift rotation speed nebmax may be increased as the acceleration request becomes greater.

In addition, in the respective embodiments, the pseudo gear shift threshold value nejdg and the first rotation speed nebase are constant without depending on the vehicle speed Vs. However, the pseudo gear shift threshold value nejdg and/or the first rotation speed nebase may be changed according to the vehicle speed Vs. For example, the pseudo gear shift threshold value nejdg and/or the first rotation speed nebase may be increased as the vehicle speed Vs is increased.

In addition, the initial values of the increase rate nvrate, the second rotation speed nestart, and the first rotation speed nebase determined in Step 825 of FIG. 8 may be obtained based on one or more of the accelerator pedal operation amount Ap, a change rate (time differential value) of the accelerator pedal operation amount Ap, the vehicle speed Vs, and the shift gear stage realized by the stepped variable transmission 51.

In the respective embodiments described above, the presence or absence (a condition for changing the value of the control execution flag Xdt from 0 to 1) of the acceleration request to be a condition for starting the NE increase control is determined based on whether or not the accelerator pedal operation amount Ap is greater than the threshold value Apth1. However, the presence or absence of the acceleration request to be a condition for starting the NE increase control may be determined by a combination of one or more of the accelerator pedal operation amount Ap, a change rate (time differential value) of the accelerator pedal operation amount Ap, the vehicle speed Vs, and the like.

What is claimed is:

1. A control device for a vehicle, the vehicle including an internal combustion engine,
a driving wheel,
a continuously variable transmission including a first input shaft and a first output shaft, the first input shaft being rotationally driven by the internal combustion engine,
the continuously variable transmission being configured to continuously change a first gear ratio, and the first gear ratio being a ratio of a rotation speed of the first input shaft to a rotation speed of the first output shaft, and
a stepped variable transmission including a second input shaft and a second output shaft, the second input shaft being connected to the first output shaft, the second output shaft being connected to the driving wheel, and the second output shaft being configured to transmit torque to the driving wheel,
the stepped variable transmission being configured to change a second gear ratio in a stepwise manner, and the second gear ratio being a ratio of a rotation speed of the second input shaft to a rotation speed of the second output shaft, and
the control device comprising:
an electronic control unit configured to
(i) control a rotation speed of the internal combustion engine in a period during which the vehicle is accelerated according to an acceleration request to the vehicle such that the rotation speed of the internal combustion engine is increased with an increase in a traveling speed of the vehicle,
(ii) when the rotation speed of the internal combustion engine reaches a predetermined pseudo gear shift threshold value, execute a pseudo gear shift to control the rotation speed of the internal combustion engine such that the rotation speed of the internal combustion engine is decreased to a first rotation speed,
(iii) execute a mechanical gear shift to change the second gear ratio according to a gear shift line determined by the traveling speed and a value according to the acceleration request, and
(iv) execute adjustment control to adjust the rotation speed of the internal combustion engine in advance in a period before executing the mechanical gear shift such that the rotation speed of the internal combustion engine matches the pseudo gear shift threshold value when the mechanical gear shift is performed.

2. The control device according to claim 1,
wherein the vehicle includes an electric motor,
the continuously variable transmission is a power distribution mechanism,
an output shaft of the electric motor is connected to the first output shaft and is configured to transmit torque to the first output shaft, and
the electronic control unit is configured to execute control of the electric motor.

3. The control device according to claim 1,
wherein the electronic control unit is configured to adjust an engine rotation speed increase rate in the adjustment control, the engine rotation speed increase rate being a ratio of a unit increase amount of the rotation speed of the first input shaft to a unit increase amount of the rotation speed of the first output shaft.

4. The control device according to claim 1,
wherein the electronic control unit is configured to adjust the first rotation speed in the adjustment control.

5. The control device according to claim 1,
wherein the electronic control unit is configured to adjust a second rotation speed in the adjustment control, and the second rotation speed is a rotation speed of the internal combustion engine at an acceleration start time when the vehicle starts to be accelerated based on the acceleration request.

6. The control device according to claim 1,
wherein the electronic control unit is configured to adjust at least two parameters among a plurality of parameters in the adjustment control, the plurality of parameters include
(a) an engine rotation speed increase rate that is a ratio of a unit increase amount of the rotation speed of the first input shaft to a unit increase amount of the rotation speed of the first output shaft,
(b) the first rotation speed, and
(c) a second rotation speed that is a rotation speed of the internal combustion engine at an acceleration start time when the vehicle starts to be accelerated based on the acceleration request to the vehicle.

7. The control device according to claim 6,
wherein the electronic control unit is configured to change at least two parameters to be adjusted in the adjustment control among the engine rotation speed increase rate, the first rotation speed, and the second rotation speed within an allowable range of each parameter such that the pseudo gear shift is executed before the mechanical gear shift is executed.

8. A control method for a vehicle, the vehicle including an internal combustion engine,
a driving wheel,
a continuously variable transmission including a first input shaft and a first output shaft, the first input shaft being rotationally driven by the internal combustion engine,
the continuously variable transmission being configured to continuously change a first gear ratio, and the first gear ratio being a ratio of a rotation speed of the first input shaft to a rotation speed of the first output shaft, and
a stepped variable transmission including a second input shaft and a second output shaft, the second input shaft being connected to the first output shaft, the second output shaft being connected to the driving wheel and the second output shaft being configured to transmit torque to the driving wheel,
the stepped variable transmission being configured to change a second gear ratio in a stepwise manner, and the second gear ratio being a ratio of a rotation speed of the second input shaft to a rotation speed of the second output shaft,
the control method comprising:
controlling a rotation speed of the internal combustion engine in a period during which the vehicle is accelerated according to an acceleration request to the vehicle such that the rotation speed of the internal combustion engine is increased with an increase in a traveling speed of the vehicle;
when the rotation speed of the internal combustion engine reaches a predetermined pseudo gear shift threshold value, executing a pseudo gear shift to control the rotation speed of the internal combustion engine such that the rotation speed of the internal combustion engine is decreased to a first rotation speed;

executing a mechanical gear shift to change the second gear ratio according to a gear shift line determined by the traveling speed and a value according to the acceleration request; and executing adjustment control to adjust the rotation speed of the internal combustion engine in advance in a period before executing the mechanical gear shift such that the rotation speed of the internal combustion engine matches the pseudo gear shift threshold value when the mechanical gear shift is performed.

\* \* \* \* \*